US008762283B2

(12) United States Patent
Gerber et al.

(10) Patent No.: US 8,762,283 B2
(45) Date of Patent: Jun. 24, 2014

(54) MULTIPLE PARTY BENEFIT FROM AN ONLINE AUTHENTICATION SERVICE

(75) Inventors: Gary E. Gerber, Foster City, CA (US); Timothy Mu-Chu Lee, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 948 days.

(21) Appl. No.: 10/838,719

(22) Filed: May 3, 2004

(65) Prior Publication Data

US 2005/0246278 A1    Nov. 3, 2005

(51) Int. Cl.
*G06Q 20/00* (2012.01)
(52) U.S. Cl.
USPC .......................................... 705/74; 705/26.1
(58) Field of Classification Search
USPC .................... 705/8, 27, 30, 39, 40, 64, 74
See application file for complete search history.

(56) References Cited

U.S. PATENT DOCUMENTS

| | | |
|---|---|---|
| 5,163,098 A | 11/1992 | Dahbura |
| 5,267,315 A | 11/1993 | Narita et al. |
| 5,420,926 A | 5/1995 | Low et al. |
| 5,442,342 A | 8/1995 | Kung |
| 5,485,510 A | 1/1996 | Colbert |
| 5,544,322 A | 8/1996 | Cheng et al. |
| 5,671,279 A | 9/1997 | Elgamal |
| 5,684,950 A | 11/1997 | Dare et al. |
| 5,712,913 A | 1/1998 | Chaum |
| 5,778,065 A | 7/1998 | Hauser et al. |
| 5,793,028 A | 8/1998 | Wagener et al. |
| 5,815,665 A | 9/1998 | Teper et al. |
| 5,826,241 A | 10/1998 | Stein et al. |
| 5,826,245 A | 10/1998 | Sandberg-Diment |

(Continued)

FOREIGN PATENT DOCUMENTS

| | | |
|---|---|---|
| AU | 2001259080 | 10/2001 |
| AU | 2002215278 | 6/2002 |

(Continued)

OTHER PUBLICATIONS

Linn, "Practical Authentication for Distributed Computing," May 7-9, 1999, 1999 IEEE Computer Society Symposium on Research in Security and Privacy, Oakland, CA.

(Continued)

*Primary Examiner* — Evens J Augustin
(74) *Attorney, Agent, or Firm* — Kilpatrick Townsend & Stockton LLP

(57) ABSTRACT

An account authentication service where a trusted party verifies an account holder's identity for the benefit of a requestor during an online transaction. The account authentication involves requesting a password from the account holder, verifying the password, and notifying the requestor whether the account holder's authenticity has been verified. An alternative embodiment of the account authentication service includes a value-adding component where information about a customer is shared with a value-adding party. The customer information is rich in detail about the customer since it is collected by each of the parties in the account authentication process. The value-adding party can then use this information in various manners. All of the parties involved can benefit from sharing the customer information. The value-adding party can be, for example, a merchant, a shipper, a security organization, or a governmental organization. A transaction identifier identifies a specific transaction between a customer, a merchant, and the customer information.

30 Claims, 11 Drawing Sheets

Account Authentication
System Architecture

(56) References Cited

U.S. PATENT DOCUMENTS

| | | | |
|---|---|---|---|
| 5,835,896 A | 11/1998 | Fisher et al. | |
| 5,845,070 A | 12/1998 | Ikudome | |
| 5,845,265 A | 12/1998 | Woolston | |
| 5,883,810 A * | 3/1999 | Franklin et al. | 700/232 |
| 5,884,272 A | 3/1999 | Walker et al. | |
| 5,903,721 A * | 5/1999 | Sixtus | 726/2 |
| 5,903,878 A | 5/1999 | Talati et al. | |
| 5,903,882 A | 5/1999 | Asay et al. | |
| 5,909,492 A | 6/1999 | Payne et al. | |
| 5,930,777 A | 7/1999 | Barber | |
| 5,970,475 A | 10/1999 | Barnes et al. | |
| 5,991,738 A | 11/1999 | Ogram | |
| 5,999,596 A | 12/1999 | Walker et al. | |
| 6,016,476 A | 1/2000 | Maes et al. | |
| 6,029,141 A * | 2/2000 | Bezos et al. | 705/27 |
| 6,047,268 A | 4/2000 | Bartoli et al. | |
| 6,052,675 A | 4/2000 | Checchio | |
| 6,070,241 A | 5/2000 | Edwards et al. | |
| 6,076,078 A | 6/2000 | Camp et al. | |
| 6,078,902 A | 6/2000 | Schenkler | |
| 6,098,053 A | 8/2000 | Slater et al. | |
| 6,122,624 A | 9/2000 | Tetro et al. | |
| 6,167,378 A * | 12/2000 | Webber, Jr. | 705/8 |
| 6,202,051 B1 | 3/2001 | Woolston | |
| 6,205,437 B1 | 3/2001 | Gifford | |
| 6,236,981 B1 | 5/2001 | Hill | |
| 6,243,691 B1 | 6/2001 | Fisher et al. | |
| 6,260,024 B1 | 7/2001 | Shkedy | |
| 6,327,578 B1 * | 12/2001 | Linehan | 705/65 |
| 6,381,316 B2 | 4/2002 | Joyce et al. | |
| 6,427,132 B1 * | 7/2002 | Bowman-Amuah | 703/22 |
| 6,629,081 B1 * | 9/2003 | Cornelius et al. | 705/30 |
| 6,704,714 B1 * | 3/2004 | O'Leary et al. | 705/39 |
| 6,735,572 B2 * | 5/2004 | Landesmann | 705/14 |
| 6,820,202 B1 | 11/2004 | Wheeler et al. | |
| 6,839,692 B2 | 1/2005 | Carrott et al. | |
| 6,879,965 B2 * | 4/2005 | Fung et al. | 705/39 |
| 6,889,325 B1 | 5/2005 | Sipman et al. | |
| 6,931,382 B2 | 8/2005 | Laage et al. | |
| 6,938,019 B1 | 8/2005 | Uzo | |
| 6,941,282 B1 * | 9/2005 | Johnson | 705/44 |
| 6,941,285 B2 | 9/2005 | Sarcanin | |
| 7,069,249 B2 * | 6/2006 | Stolfo et al. | 705/74 |
| 7,177,838 B1 | 2/2007 | Ling | |
| 7,177,849 B2 * | 2/2007 | Fieschi et al. | 705/72 |
| 7,249,093 B1 | 7/2007 | King | |
| 7,318,048 B1 | 1/2008 | King | |
| 7,370,011 B2 * | 5/2008 | Bennett et al. | 705/39 |
| 7,392,388 B2 | 6/2008 | Keech | |
| 7,707,120 B2 | 4/2010 | Dominguez et al. | |
| 8,019,678 B2 | 9/2011 | Wright et al. | |
| 2001/0014158 A1 | 8/2001 | Baltzley | |
| 2001/0029496 A1 | 10/2001 | Otto et al. | |
| 2001/0039535 A1 | 11/2001 | Tsiounis et al. | |
| 2001/0044787 A1 | 11/2001 | Shwartz et al. | |
| 2001/0051902 A1 * | 12/2001 | Messner | 705/26 |
| 2001/0054003 A1 | 12/2001 | Chien et al. | |
| 2002/0007352 A1 | 1/2002 | Fieschi et al. | |
| 2002/0019811 A1 | 2/2002 | Lapsley et al. | |
| 2002/0069079 A1 | 6/2002 | Vega | |
| 2002/0069174 A1 | 6/2002 | Fox et al. | |
| 2002/0091646 A1 | 7/2002 | Lake et al. | |
| 2002/0128977 A1 | 9/2002 | Nambiar et al. | |
| 2002/0143925 A1 | 10/2002 | Pricer et al. | |
| 2002/0147625 A1 | 10/2002 | Kolke, Jr. | |
| 2002/0169720 A1 | 11/2002 | Wilson et al. | |
| 2002/0174062 A1 * | 11/2002 | Sines et al. | 705/39 |
| 2002/0188574 A1 * | 12/2002 | Niwa | 705/64 |
| 2003/0097451 A1 * | 5/2003 | Bjorksten et al. | 709/228 |
| 2003/0120615 A1 | 6/2003 | Kuo | |
| 2003/0144952 A1 | 7/2003 | Brown et al. | |
| 2003/0149781 A1 * | 8/2003 | Yared et al. | 709/229 |
| 2003/0200184 A1 | 10/2003 | Dominguez et al. | |
| 2003/0208684 A1 | 11/2003 | Camacho et al. | |
| 2003/0212642 A1 | 11/2003 | Weller et al. | |
| 2003/0220841 A1 | 11/2003 | Maritzen | |
| 2003/0225729 A1 | 12/2003 | Maloche | |
| 2004/0002903 A1 * | 1/2004 | Stolfo et al. | 705/26 |
| 2004/0019563 A1 * | 1/2004 | Sines et al. | 705/42 |
| 2004/0044627 A1 | 3/2004 | Russell et al. | |
| 2004/0078328 A1 * | 4/2004 | Talbert et al. | 705/40 |
| 2004/0177047 A1 | 9/2004 | Graves et al. | |
| 2004/0230536 A1 * | 11/2004 | Fung et al. | 705/64 |
| 2004/0243520 A1 | 12/2004 | Bishop et al. | |
| 2005/0065855 A1 * | 3/2005 | Geller | 705/26 |
| 2005/0131826 A1 | 6/2005 | Cook | |
| 2005/0192896 A1 * | 9/2005 | Hutchison et al. | 705/40 |
| 2006/0242058 A1 * | 10/2006 | Torto | 705/39 |

FOREIGN PATENT DOCUMENTS

| | | |
|---|---|---|
| EP | 0 896 284 | 2/1999 |
| EP | 0 896 284 A | 2/1999 |
| EP | 1020824 A2 | 7/2000 |
| EP | 1 271 435 A2 | 1/2003 |
| FR | 2837952 A1 | 10/2003 |
| JP | 11-43780 | 11/1997 |
| JP | 10-313488 | 4/1998 |
| JP | 2000-184085 | 12/1998 |
| JP | 2000-236353 | 11/1999 |
| JP | 2000-076336 | 3/2000 |
| JP | 2001-313979 | 4/2000 |
| JP | 2001-344550 | 6/2000 |
| JP | 2000-142398 | 9/2000 |
| JP | 2003-586704 | 2/2001 |
| JP | 2001-291032 | 3/2001 |
| JP | 2002-91473 | 6/2001 |
| JP | 2001-290932 A | 10/2001 |
| JP | 2002-083247 A | 3/2002 |
| JP | 2002-109409 A | 4/2002 |
| JP | 2002-245383 A | 8/2002 |
| JP | 2002-366784 A | 12/2002 |
| JP | 2003-044771 A | 2/2003 |
| JP | 2004-046568 A | 2/2004 |
| JP | 2004-088534 A | 3/2004 |
| JP | 2004-508644 A | 3/2004 |
| JP | 2004-537781 A | 12/2004 |
| JP | 2005-523505 A | 8/2005 |
| KR | 2000-0043903 A | 7/2000 |
| KR | 2001-0008131 A | 2/2001 |
| KR | 10-2002-0037980 A | 5/2002 |
| WO | WO 92/11598 | 7/1992 |
| WO | 98/40809 A2 | 9/1998 |
| WO | WO 99/42961 | 8/1999 |
| WO | WO 99/42961 A | 8/1999 |
| WO | WO 99/46881 | 9/1999 |
| WO | 00 67143 | 4/2000 |
| WO | WO 00/67143 | 11/2000 |
| WO | 01/11513 A1 | 2/2001 |
| WO | WO 01/07873 A2 | 2/2001 |
| WO | WO 01/13275 | 2/2001 |
| WO | WO 01/13275 A1 | 2/2001 |
| WO | 01/22329 A1 | 3/2001 |
| WO | 01 78493 A2 | 4/2001 |
| WO | 01 82190 | 4/2001 |
| WO | WO 01/37180 | 5/2001 |
| WO | WO 01/48628 | 7/2001 |
| WO | WO 01/63878 A1 | 8/2001 |
| WO | WO 01/67201 A2 | 9/2001 |
| WO | WO 01/69549 A1 | 9/2001 |
| WO | WO 01/78493 A | 10/2001 |
| WO | WO 01/78493 A2 | 10/2001 |
| WO | WO 01/78493 A2 | 10/2001 |
| WO | WO 01/99378 A | 12/2001 |
| WO | WO 02/03285 | 1/2002 |
| WO | WO 02/03285 A1 | 1/2002 |
| WO | WO 02/21464 | 3/2002 |
| WO | WO 03/107242 | 12/2003 |
| WO | WO 2004/079603 | 9/2004 |

OTHER PUBLICATIONS

Sherman et al., "Secure Network Access Using Multiple Applications of AT&T's Smart Card," Sep./Oct. 1994, AT&T Technical Journal.

(56) References Cited

OTHER PUBLICATIONS

Leach, "Dynamic Authentication for Smartcards," 1995, Computers & Security, vol. 14, No. 5, pp. 385-389.
Ganesan, "The Yaksha Security System," Mar. 1996, Communications of the ACM, vol. 39, No. 3, pp. 55-60.
Zhou et al., "A Fair Non-Repudiation Protocol," May 6-8, 1996, 1996 IEEE Symposium on Security and Privacy, pp. 55-61 Oakland, CA.
Bakker, "Mutual Authentication with Smart Cards," May 10-11, 1999, Proceedings of the USENIX Workshop on Smartcard Technology (Smartcard '99), pp. 63-74, Chicago, Illinois.
http://www.orbiscom.com, Jun. 30, 2000.
Weller et al., "Online Payer Authentication Service," U.S. Appl. No. 09/842,313, filed Apr. 24, 2001, 69 pages.
Dominguez et al., "Online Account Authentication Service,", U.S. Appl. No. 10/156,271, filed May 24, 2002, 75 pages.
Dominguez et al., "Mobile Account Authentication Service," U.S. Appl. No. 10/370,149, filed Feb. 19, 2003, 81 pages.
Dominguez et al., "Data Authentication and Provisioning Method and System," U.S. Appl. No. 10/660,263, filed Sep. 10, 2003, 26 pages.
eBay. (Nov. 3, 1999). http://web.archive.org/web/19991103051532/http://www.ebay.com/. Retrieved online Aug. 18, 2004.
O'Mahony, Donald et al. "Electronic Payment Systems." 1997 Artech House Inc., Norwood, MA.
International Search Report; PCT/US 2004/014587; Filing date Nov. 5, 2004.
Supplementary European Search Report; Dated Mar. 31, 2005; European Patent Apl. No. 03726334.0.
Prince, "Online Auctions at eBay" (Apr. 1999). Prima Publishing Rocklin, CA.
United States District Court for the Northern District of Texas; Civil Action No. CIV 3-03CV0976-L; "Defendants' Preliminary Invalidity Contentions"; Starpay.com, L.L.C., Plaintiffs vs. Visa International Service Associate and Visa U.S.A. Inc., Defendants; May 28, 2004.
Supplementary European Search Report; Feb. 9, 2006; PCT/US 0328599.
International Search Report; PCT/US 03/28599.
U.S. Appl. No. 60/165,546 and U.S. Appl. No. 60/165,547.
Korean Patent Abstract; Publication No. 1020000012391 A; Mar. 6, 2000.
Office Action; U.S. Appl. No. 09/842,313; dated Nov. 10, 2004.
Office Action; U.S. Appl. No. 09/842,313; dated Aug. 3, 2005.
Office Action; U.S. Appl. No. 09/842,313; dated Mar. 10, 2006.
Office Action; U.S. Appl. No. 09/842,313; dated Oct. 4, 2006.
Office Action; U.S. Appl. No. 10/156,271; dated Aug. 23, 2004.
Office Action; U.S. Appl. No. 10/156,271; dated Feb. 11, 2005.
Office Action; U.S. Appl. No. 10/156,271; dated Jun. 24, 2005.
Office Action; U.S. Appl. No. 10/156,271; dated Dec. 20, 2006.
Office Action; U.S. Appl. No. 10/156,271; dated Aug. 23, 2007.
Office Action; U.S. Appl. No. 10/384,735; dated Aug. 20, 2007.
Office Action; U.S. Appl. No. 10/370,149; dated Dec. 28, 2006.
Office Action; U.S. Appl. No. 10/660,263; dated Jan. 24, 2005.
Office Action; U.S. Appl. No. 10/660,263; dated Jul. 20, 2005.
Office Action; U.S. Appl. No. 10/660,263; dated Feb. 10, 2006.
Office Action; U.S. Appl. No. 10/660,263; dated Jul. 31, 2006.
Office Action; U.S. Appl. No. 10/660,263; dated May 18, 2007.
Office Action dated Mar. 21, 2008 in U.S. Appl. No. 09/842,313.
Office Action dated Feb. 12, 2008 in U.S. Appl. No. 10/156,271.
Office Action dated Sep. 5, 2008 in U.S. Appl. No. 10/660,263.
Office Action dated Dec. 11, 2007 in U.S. Appl. No. 10/370,149.
J. Kohl and C. Neuman; "The Kerberos Network Authentication Service (V5)," Sep. 1993; pp. 1-10, URL: http://www.ietf.org/rfc1510.txt, downloaded on Apr. 29, 2008.
Search Report from corresponding Singapore Application No. 200701817-9, mailed Jun. 23, 2008.
Written Opinion from corresponding Singapore Application 2007/01817-9, mailed Jun. 23, 2008.
Office Action dated Jan. 22, 2009 in U.S. Appl. No. 10/156,271.
Office Action dated Mar. 9, 2009 in U.S. Appl. No. 10/370,149.
Office Action dated Nov. 17, 2008 in U.S. Appl. No. 10/660,263.
Office Action dated May 13, 2009 in U.S. Appl. No. 10/838,719.
Office Action dated Jul. 14, 2008 in U.S. Appl. No. 10/838,719.
Office Action dated Feb. 6, 2009 in U.S. Appl. No. 10/838,719.
Office Action dated Sep. 12, 2008 in Patent Application No. 2003228574 AU.
Office Action dated Dec. 24, 2008 Patent Application No. 2004-80039179.6 CN.
Office Action dated Apr. 18, 2007 Patent Application No. 2006-03488-8 SG.
Office Action dated Feb. 10, 2009 Patent Application No. 2003-586704;JPO.
Office Action dated Nov. 10, 2009 Patent Application No. 2002-7014247; KR.
"Chambers"; Retrieved Nov. 3, 2008, 1pg. from http://www.credoreference.com/entry/1196447/.
Office Action dated Nov. 10, 2008 Patent Application No. 2002-7014247; KR.
European Extended Search Report; Application No. 09150401.9-1238; Apr. 9, 2009.
Office Action dated Jun. 5, 2009 in U.S. Appl. No. 09/842,313.
Office Action dated Jun. 17, 2009 in U.S. Appl. No. 12/034,606.
Mexican Office Action dated May 15, 2009; Application No. PA/A/2006/006158.
Translation of Mexican Office Action dated May 15, 2009; App No. PA/A2006/006158.
Office Action dated Aug. 28, 2009 in the U.S. Appl. No. 10/660,263.
Office Action dated Aug. 17, 2009 in the U.S. Appl. No. 10/156,271.
Office Action dated Jun. 17, 2009 in the U.S. Appl. No. 12/034,606.
Examination Report mailed Jul. 10, 2012, EP04821996.8, 7 pages.
Australian Examiner's Report No. 3 for Application No. 2004319618, dated Aug. 29, 2011, 3 pages.
Exhibit BB-15 to the statutory declaration of Bahram Boutorabi; Jan. 25, 2001.
Exhibit BB-16 to the statutory declaration of Bahram Boutorabi; Jan. 25, 2001.
Exhibit BB-18 to the statutory declaration of Bahram Boutorabi; Feb. 7, 2000.
Exhibit BB-19 to the statutory declaration of Bahram Boutorabi; Apr. 16, 2002.
Exhibit BB-20 to the statutory declaration of Bahram Boutorabi; May 2, 2002.
Exhibit BB-21 to the statutory declaration of Bahram Boutorabi; May 21, 2002.
Exhibit BB-22 to the statutory declaration of Bahram Boutorabi; Feb. 13, 2002.
Exhibit BB-23 to the statutory declaration of Bahram Boutorabi; Apr. 7, 2009.
Exhibit BB-24 to the statutory declaration of Bahram Boutorabi; Oct. 27, 1999.
Australian Opposition; "Statement of Grounds of Opposition and Particulars Relating to Each Ground"; Oct. 10, 2008; pp. 1-10.
Exhibit BB-4 to the statutory declaration of Bahram Boutorabi; Jan. 27, 2009.
Exhibit BB-5 to the statutory declaration of Bahram Boutorabi; Jan. 27, 2009.
Exhibit BB-6 to the statutory declaration of Bahram Boutorabi; Jan. 27, 2009.
Exhibit BB-7 to the statutory declaration of Bahram Boutorabi; Jan. 27, 2009.
Exhibit BB-8 to the statutory declaration of Bahram Boutorabi; Jan. 27, 2009.
Commonwealth of Australia Statutory Declaration of Bahram Boutorabi; Apr. 7, 2009.
Commonwealth of Australia Statutory Declaration of Andrew Weller; Apr. 6, 2009.
Novell Debuts New DIGITALME in the Net, Oct. 6, 1999, http://www.digitalme.com.

(56) References Cited

OTHER PUBLICATIONS

Written Opinion and Search Report mailed Dec. 6, 2011 in Singaporean Patent Application No. 200808081-4, 13 pages.
Office Action (English Translation) mailed Jul. 13, 2010 in Japanese Patent Application No. 2007-511334, 5 pages.
Office Action (English Translation) mailed Mar. 9, 2010 in Japanese Patent Application No. 2007-511334, 4 pages.
Office Action (English Translation) mailed Sep. 29, 2009 in Japanese Patent Application No. 2007-511334, 4 pages.

* cited by examiner

Account Authentication
System Architecture

System Architecture for Payment Transactions

Account Holder Registration

300

Registration Page

Last 3 Digits of Account Number :

Security Information

Name :

City :

State :   ZIP:

Mother's Maiden Name :

Last 4 Digits of SSN :

List of Banks

Name on Card :

FIG. 4

Payment Transaction on
Account Authentication System

Payment Transaction
Account Holder Password Prompt

System Architecture for Payment
Transaction: Message Detail

Transaction with Value Adding Party Using
Account Authentication System

MULTIPLE PARTY BENEFIT FROM AN ONLINE AUTHENTICATION SERVICE

CROSS-REFERENCE TO RELATED APPLICATIONS

This application is related to U.S. patent application Ser. No. 10/660,263, filed Sep. 10, 2003, entitled "Profile and Identity Authentication Services," which claims priority of U.S. provisional patent application Nos. 60/410,032 and 60/469,284, which are all hereby incorporated by reference.

This application is related to U.S. patent application Ser. No. 10/370,149, filed Feb. 19, 2003, entitled "Mobile Account Authentication Service," which claims priority of U.S. provisional patent application Nos. 60/373,702 and 60/405,869, which are all hereby incorporated by reference.

This application is related to U.S. patent application Ser. No. 10/156,271, filed May 24, 2002, entitled "Online Account Authentication Service," which is a continuation-in-part of U.S. patent application Ser. No. 09/842,313 filed Apr. 24, 2001, entitled "On-Line Payer Authentication Service," which in turn claims priority of U.S. provisional patent application No. 60/199,727, all of which are hereby incorporated by reference.

FIELD OF THE INVENTION

The present invention relates generally to authenticating the identity of account holders during online transactions, and more specifically to techniques for sharing and using information related to the authentication process with value-adding parties.

BACKGROUND

During a payment transaction using a payment card (e.g., a credit, debit, or stored value card), it is important to verify a cardholder's ownership of an account to avoid a variety of problems, such as unauthorized use. Payer authentication is the process of verifying a cardholder's ownership of an account. The most common method to authenticate a cardholder's ownership of an account occurs routinely at a point of sale during what is called a "card present" transaction. A card present transaction involves a merchant's representative taking the cardholder's card, swiping it though a payment card terminal to verify account status and credit line availability, and then checking to see that the signature on the back of the card matches the purchaser's signature. If the merchant follows specific guidelines for this type of transaction, the merchant will be guaranteed payment for the amount authorized less discount and fees. A service provider such as Visa International Service Association (or service organization) may provide these specific guidelines.

"Card not present" transactions, on the other hand, such as those occurring online, through the mail, or over the telephone, involve payments that are not guaranteed to the merchant. No guarantee is provided primarily because the payers are not authenticated in such non face-to-face transactions, thereby allowing many risks to accompany the "card not present" transactions. Such risks involve issues such as chargebacks of payment transactions to online merchants, fraud for both merchants and cardholders, increased exception item processing expenses for banks, and an increased perception that buying goods and services online is not safe and secure, which may keep some consumers from buying online. Specific examples of risks include the unauthorized use of stolen account information to purchase goods and services online, fabrication of card account numbers to make fraudulent online purchases, and extraction of clear text account information from network traffic.

Given the continued expected high growth of electronic commerce, it is important to provide methods to authenticate payers. Given the breadth of online transaction types, it is also important to provide methods to authenticate the identity of parties regardless of whether there is a commercial aspect to a transaction. This will benefit all transaction participants ranging from cardholders, merchants, financial institutions, to government agencies. Authenticating the customers during online transactions will reduce the levels of fraud, disputes, retrievals and charge-backs, which subsequently will reduce the costs associated with each of these events. Authenticating customers also addresses security concerns and therefore will lead to increased online activity. Prior systems used to authenticate parties during online transactions have not been widely adopted because these systems were difficult to use, had complex designs, required significant up-front investment by system participants and lacked interoperability. Certain prior systems additionally required the creation, distribution and use of certificates by merchants, cardholders, issuers and acquirers. Such use of certificates is known to be quite burdensome.

In view of the foregoing, there are continuing efforts to provide improved systems for authenticating the identity of customers in online transactions. Furthermore, there are also continuing efforts to beneficially utilize the information available to parties involved in such authentication processes.

BRIEF SUMMARY OF THE INVENTION

The present invention is directed to an account authentication service that authenticates the identity of a presentor during online transactions. The authentication service allows a trusted party to verify an account holder's identity for the benefit of a requesting party ("requester") using a variety of authentication methods, such as with passwords or tokens. Authenticating the identity of an account holder during an online transaction involves requesting a password from the account holder, verifying the password, and notifying the requestor whether the account holder's authenticity has been verified. An alternative embodiment of the account authentication service includes a value-added component where information about a customer is shared with a value-adding party. The customer information is rich in detail about the customer since it is collected by each of the parties in the account authentication process. The value-adding party can then use this information in various manners. All of the parties involved can benefit from sharing the customer information and each party can agree as to how they can help each other gain value. By using a transaction identifier, which identifies a specific transaction between a customer and a merchant and the customer information, each of the parties can also audit the transactions and any agreements related to the customer information.

As a method, one embodiment of the present invention includes at least receiving an identity-authenticating password from the presentor and comparing the identity-authenticating password against a password previously designated for an account of the presentor. The method also includes notifying a requestor that the presentor is the actual owner of the account when the identity-authenticating password received from the presentor matches the password that was previously designated for the account. In this way, the trusted party authenticates for the benefit of the requestor that the presentor is the actual owner of the account. The method also includes sending presentor information to the value-adding party. In some embodiments, the method further involves evaluating the presenter information against a set of criteria and sending the presenter information to the value-adding party if the presenter information satisfies the set of criteria. This allows the value-adding party to receive desirable customer information. Also, each of the requestor and value-adding party can agree to a set of rights and obligations as a condition before the presenter information is sent to the value-adding party. Additionally, a transaction identifier can be used to track individual online transactions and the related customer information.

In one embodiment of the invention, the requester is a merchant and the value-adding party is a shipping company who can use the customer information to ship a product purchased from the merchant. The customer information assists the shipping company in deciding if and how it will ship a product to the customer.

In another embodiment of the invention, the requester is a merchant and the value-adding party is a follow-on merchant who can use the customer information to market its own goods or services to the customer. The customer information assists the follow-on merchant in deciding if and how it will correspond with the customer.

In another embodiment of the invention, the value-adding party is a security organization that can use the customer information to evaluate security concerns. The customer information assists the security organization in deciding if and how it will address possible security concerns.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which:

FIG. 4 illustrates one embodiment of an Internet web page in which an account holder can enter information during the account authentication system enrollment process.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

Figure 1:
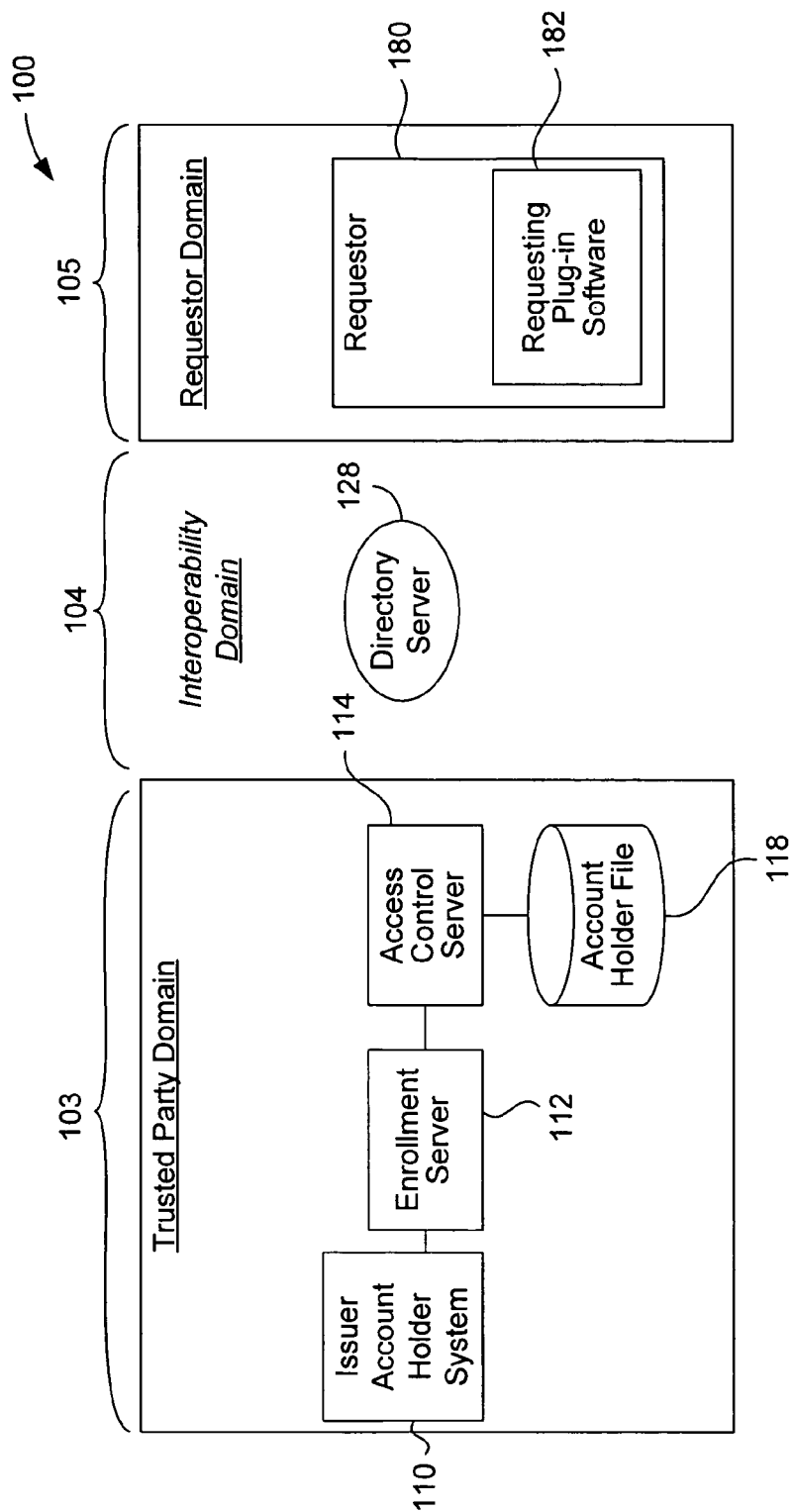
FIG. 1 illustrates one embodiment of a system architecture for implementing the account authentication service of the present invention for various types of account authentication applications.

The present description, in FIG. 1, will begin with an overview of a generalized account authentication system and protocol according to the present invention. The account authentication system is provided as a service to participating issuers, account holders, and merchants. Then, in FIGS. 2-7, an embodiment of the account authentication system relating to online payment transactions is described. The description of online payment transactions covers the payment transaction itself, system setup, customer registration, and specific message flows. The description for online payment transactions is analogous to the description for non-payment transactions. Both payment and non-payment transactions involve the authentication of an account holder's identity.

Figure 8:
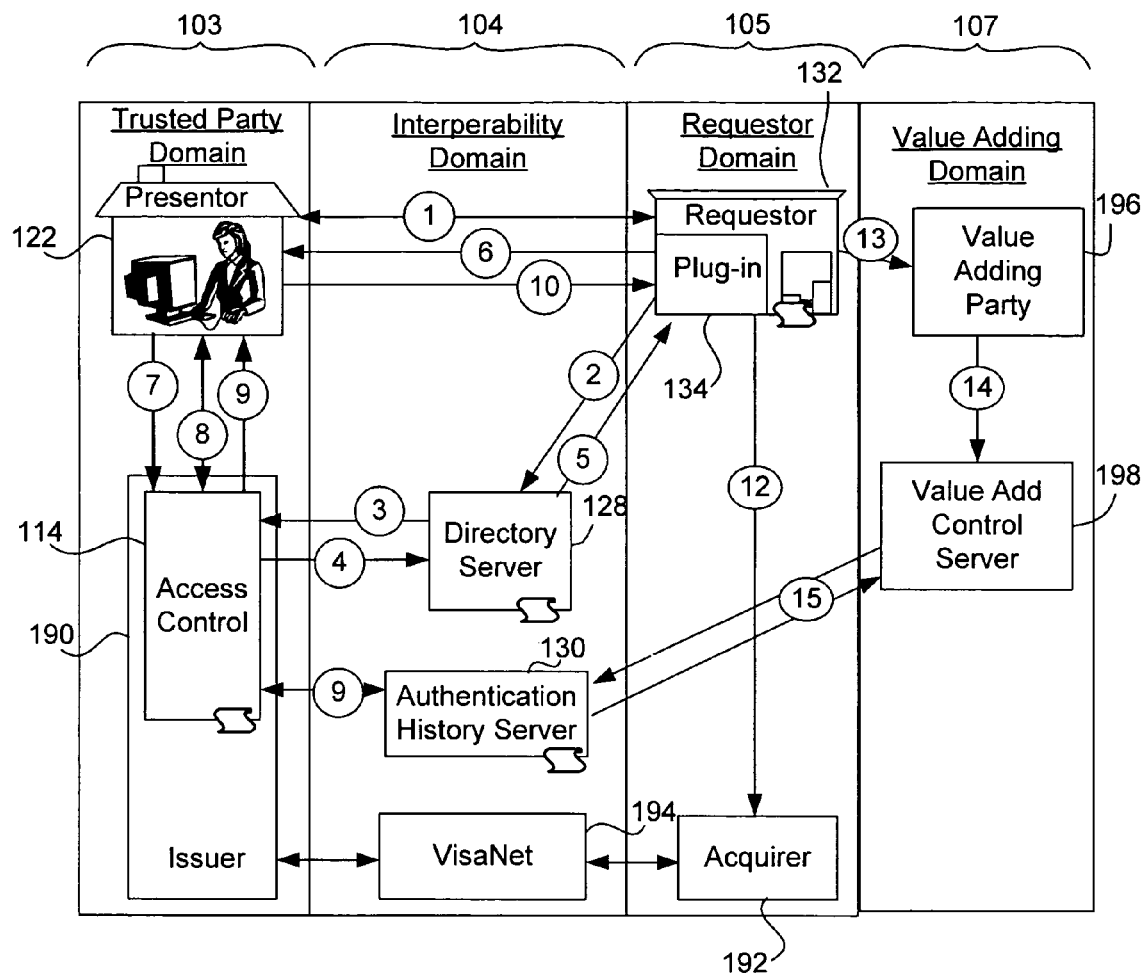
FIG. 8 illustrates an exemplary system architecture and a set of message flows involved with online account authentication that includes a value-adding aspect.

Then in FIG. 8, the description describes an embodiment of the account authentication process that includes a value-adding component. Value is added by first sharing information about a customer with a value-adding party. The customer information is rich in detail about the customer since it is collected by each of the parties in the account authentication process. The value-adding party can then use this information in various manners. For instance, the value-adding party can then provide focused information to the customer or ship a good to the customer. All of the parties involved can benefit from sharing the customer information and each party can agree as to how they can help each other gain the benefits. By using a transaction identifier, which identifies a specific transaction between a customer and a merchant and the customer information, each of the parties can also audit the transactions and any agreements related to the customer information. This application describes how the sharing of such information can be advantageously used in a wide range of applications to the benefit of a wide range of parties.

Account Authentication System

The account authentication system is designed to authenticate account ownership of an account holder during transactions in which one party cannot physically verify the identity of another party who purports to be the owner of a specific account. For example, the account authentication system can be used in various transactions when a trusted party authenticates the identity of a presenter for the benefit of a requestor. A presenter is any individual or entity that presents itself as having a specific identity. A requestor is any individual or entity that requests a trusted party to authenticate the identity of the presenter. A trusted party is an entity capable of authenticating the identity of the presenter and whom the presenter and requestor trust to perform the authentication process. The trusted party can agree to protect the interests of the requestor in case of mistakes or fraud with respect to the identity of the presenter. An important application of the account authentication system is in the field of payment transactions that take place either online or over portable electronic devices.

However, the system can be useful in many applications aside from payment transactions. The system of the present invention can be used in various non-payment situations where the identity of a customer requires authentication. For example, non-payment transactions include transactions such as authenticating a customer who accesses an Internet web site to complete an online form, e.g., for a registration process. Non-payment transactions also include many aspects of retail banking, wholesale banking, medical businesses, insurance businesses, and brokerage businesses, just to mention a few. Retail banking involves account numbers used with cards such as debit cards, purchase cards, and stored value cards. Non-payment transactions also include filling out online forms for things such as identification cards and licenses. For example, the American Automobile Association (AAA) can use the system to authenticate the identity of one of its customers or a telephone card company can use the system to authenticate the identity of the user of a specific card.

FIG. 1 illustrates one embodiment of system architecture 100 for implementing the account authentication system for various types of account authentication applications. System architecture 100 includes three domains: a trusted party domain 103, an interoperability domain 104, and a requester domain 105. The trusted party and requestor domains define functional realms within which are components that are totally or at least partially controlled by the trusted party or requester, respectively. The interoperability domain defines a functional realm within which are components may be utilized by the trusted party, the requester, as well as other parties, such as a service organization.

The trusted party domain 103 includes components that are primarily controlled by a trusted party. An example of a trusted party is a financial institution that issues payment cards to consumers, known as an issuing bank. Specifically, an issuer, or a card issuer, personalizes new cards received from a card supplier and then issues these cards to its customers. Personalization may also be performed by the card supplier or by a personalization bureau. In addition to being a financial institution, an issuer may be any suitable issuing entity such as telecommunications network operator, a service association, a merchant or other organization, or even an agent acting for an issuer. Requestor domain 105 includes components that are primarily controlled by a requestor. A requestor can be any party who makes a request for the identity of an account holder to be authenticated. For example, a requestor can be a merchant who desires to authenticate the identity of a person alleging to be the owner of a credit card account. An acquirer can be a financial institution that enrolls requesters in the payment scheme and manages the accounts of requestors. An acquirer also routes information from an online merchant to the telecommunications network. In other embodiments, a merchant can directly route information to the telecommunications network.

Interoperability domain 104 can be supported by the Internet and includes components used by both the trusted party and the requestor.

Trusted party domain 103 includes an issuer account holder system 110, an enrollment server 112, an access control server (ACS) 114, and an account holder file 118. Additional components are included within trusted party domain 103 depending upon the specific field of use in which the system will be used. For example in the payment transactions below, additional components in each of the domains are present for the purpose of authenticating account holder identities with respect to payment transactions.

Enrollment server 112 is a computer that manages an account holder's enrollment into the account authentication system by presenting a series of questions via a web interface to be answered by the account holder and verified by the trusted party. As shown in FIG. 1, the trusted party operates enrollment server 112. However, a service organization such as Visa can operate enrollment server 112 on behalf of the trusted party. The trusted party can use a web-enabled, interactive "identity authentication service" provided by an outside entity during the enrollment process to help validate an account holder's identity.

ACS 114 is a computer that has a database of account holders registered for the account authentication service provided by the account authentication system. ACS 114 contains account and password information for each account holder. During an account authentication transaction, ACS 114 provides digitally signed receipts to an authentication requestor, controls access to the account authentication system, and validates account holder participation in the service. A card issuer or a service organization such as Visa can operate ACS 114 for the trusted party. While the account authentication service does not require any additional account holder software to be used, optional account holder software and hardware may be deployed. Additional account holder software can support additional authentication techniques such as digital certificates, integrated circuit cards (chip cards) and chip card readers. Note that in the present invention, the only system participant requiring a certificate is the issuing financial institution.

Account holder file 118 is a trusted party managed database for storing information relating to the account holders who are successfully enrolled with the account authentication system. Issuer account holder system 110 (or Trusted Party Account Holder System) is controlled by the trusted party and contains information about account holders. Such information relates to account information, services utilized by the account holder, etc. Some of the information within the issuer account holder system 110 can be used in enrolling account holders into the account authentication service.

Requestor 180 of requester domain 105 typically desires the authentication of an account holder. Party 180 manages requesting plug-in software 182 that facilitates the authentication protocol. Requesting plug-in software module 182 is a software module that integrates into a third or requestor's web site. Plug-in software module 182 provides the interface between the account authentication system and the requestor's processing software, for example, the payment processing software of a merchant.

Interoperability domain 104 contains the directory server 128, is supported by the Internet, and includes components used by both the trusted party and the requestor. Directory server 128 routes authentication requests from requestors to specific ACS's, such as ACS 114. Directory server 128 is operated by a card scheme manager or a service organization, such as Visa. Interoperability domain 104 can also be supported by a network other than the Internet.

Account Authentication System for Payment Transactions

A description of the system architecture for authenticating an account holder in the realm of payment transactions will now be provided. Note that many of the general concepts described in this section are applicable to various fields of use since the authentication process for payment applications is analogous to non-payment applications.

An exemplary use of the authentication system and protocol in payment transactions is described as follows. The authentication system is useful in a scenario when an account holder shops online, adds items to a "shopping cart," proceeds to the online merchant's checkout page, and completes the online merchant's checkout forms. The authentication processes can take place after the consumer decides to buy his or her desired products or services, for example, after the consumer clicks a "buy" button. The authentication process can also begin at various other times in the consumer's payment transaction. The authentication process is conducted mostly in a transparent mode to the consumer by utilizing software that has been incorporated in several points of a payment network. The system validates participation by the account holder and the account holder's financial institution with the authentication service. Then a window is created in which the consumer can confirm his or her identity by requesting a previously registered password from the account holder. If the identity of the consumer is confirmed, the payment information and notice of the consumer's authentication is sent back to the merchant. Then, as conventionally performed, the payment transaction is processed by the merchant. For example, the merchant may send an order confirmation message to the account holder's browser.

Figure 2:
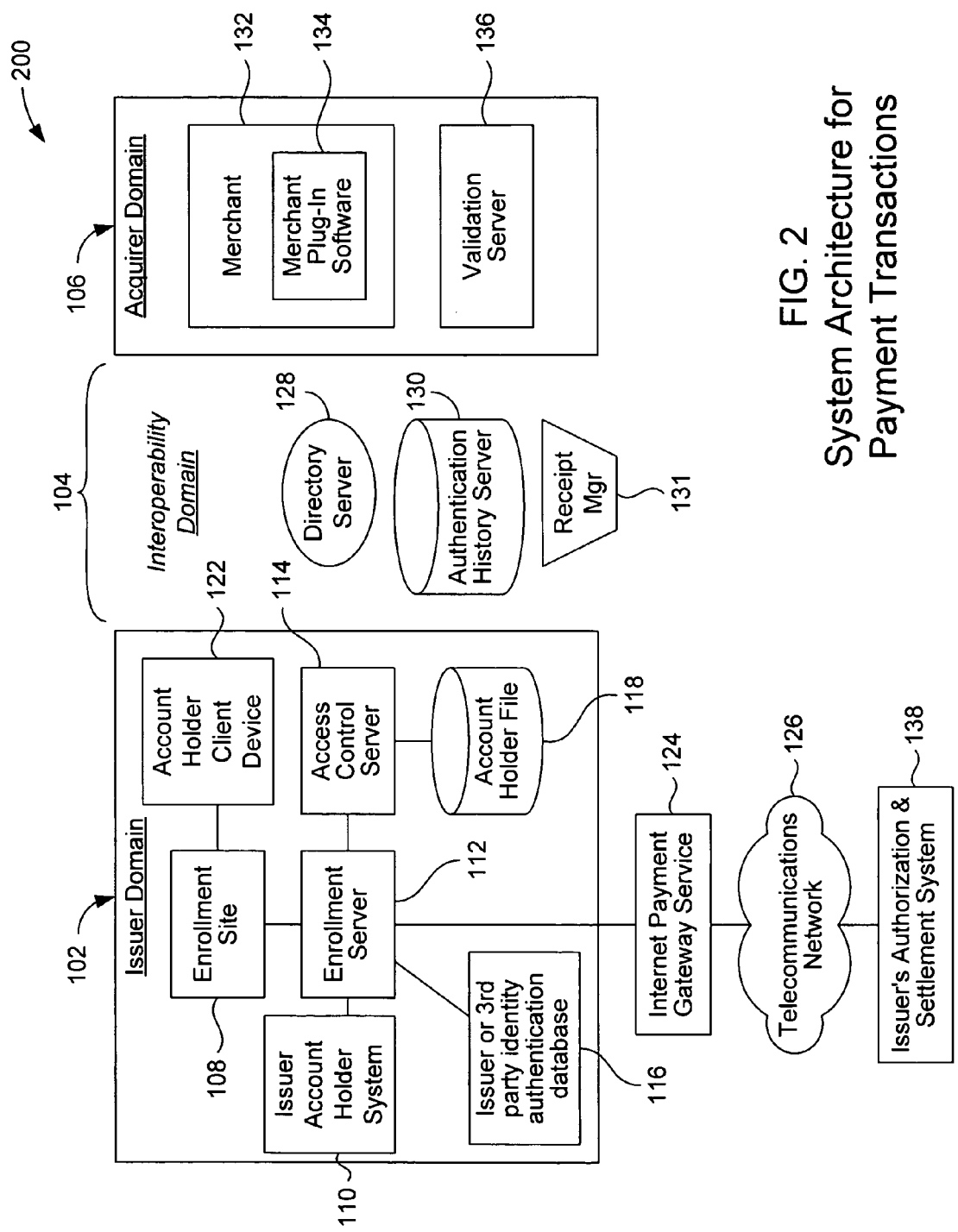
FIG. 2 schematically illustrates one embodiment of a system architecture that supports the authentication service of the present invention in payment transactions.

FIG. 2 schematically illustrates one embodiment of a system architecture 200 that supports the authentication service in payment transactions. As with the general system architecture 100 of FIG. 1, architecture 200 is divided into three domains: issuer domain 102, interoperability domain 104, and acquirer domain 106. Issuer domain 102 and acquirer domain 106 of FIG. 2 are analogous to trusted party domain 103 and requestor domain 105 of FIG. 1, respectively.

Issuer domain 102 includes an enrollment site 108, an issuer account holder system 110, an account holder client device 122, an enrollment server 112, an access control server (ACS) 114, an issuer or requestor identity authentication component 116, and an account holder file 118. Optionally, the issuer domain 102 can include an issuer file of approved account holders 120. An account holder is another term that refers to a presentor since the account holder will hold itself out as having a specific identity. Enrollment server 112 is a computer that manages account holder enrollment into the account authentication system through presenting a series of questions via a web interface to be answered by the account holder and verified by the issuer. Enrollment server 112 is connected via the Internet to the Internet Payment Gateway Service 124, which is in turn, connected to a telecommunications network 126, for example, VisaNet. The Internet Payment Gateway Service 124 allows enrollment server 112 to communicate with telecommunications network 126. The connection via Payment Gateway Service 124 allows enrollment server 112 to query the issuer's authorization system 127 to determine if an account holder being enrolled has an active card account. Enrollment site 108 is an Internet web site where the account holder can register to participate in the account authentication service provided by the account authentication system.

Account holder client device 122 is used by the account holder to participate in the account authentication system. Specifically, account holder client device 122 can be any device capable of accessing the Internet, such as a personal computer, mobile telephone, a personal data assistant, or an interactive cable television. In some embodiments, account holder client device 122 cannot connect to the Internet, however such devices can still be used by an account holder because input and output messages from client device 122 are routed through special nodes that can handle non-Internet based messages. For example, mobile telephones that transmit and receive messages based upon voice and/or text messages do not connect to the Internet, however they can still be used with the account authentication system by routing messages in a different manner. The Short Message Service (SMS) is a commonly used example of a messaging system. An Interactive Voice Response (IVR) unit can be used for automated exchanges over a voice channel. This message routing arrangement will be described in more detail in the following section on non-Internet capable devices.

Issuer account holder system 110 is an issuer-controlled system containing information about account holders. This system information contains information concerning account information, services utilized by the account holder, etc. Some of the information within the issuer account holder system can be used in the process for enrolling account holders into the account authentication system.

Issuer or requestor identity authentication database 116 contains information that the issuer or requestor already has on file regarding account holders. Database 116 is used by issuer in the process of enrolling account holders to verify the identity of the account holders. For instance, information entered by account holders during the accountholder registration process should match the information already on file in authentication database 116 in order for account holders to successfully register for the service provided by the account authentication system. Third parties can be companies such as Equifax.

Interoperability domain 104 includes a directory server 128, an authentication history server 130 and a receipt manager 131. Directory server 128 routes authentication requests from merchants to specific ACS's. Directory server 128 is operated by a service organization, such as Visa. Authentication history server 130 and receipt manager 131 store signed receipts (e.g., copies of the Payment Request Response message that are described below) for each authenticated payment transaction. Authentication history server 130 contains information that verifies which transactions were authenticated and provides additional information during dispute resolution processes. Authentication history server 130 and receipt manager 131 are operated by a service organization. The issuer, acquirer, or merchant can also maintain a copy of the digitally signed receipt.

Acquirer domain 106 includes the merchant 132 and the validation server 136. A MPI 134 resides at the location of merchant 132. MPI 134 is a software module that integrates into a merchant's electronic commerce web sites. MPI 134 provides the interface between the account authentication system and the merchant's payment processing software.

Note that MPI 134 is the same software module as requesting plug-in software module 182 of FIG. 1. The descriptor of "merchant" is used for MPI 134 to indicate that the type of requesting party that is utilizing the plug-in software module. However, it should be understood that the plug-in software modules described throughout this specification functions basically in the same manner regardless of the adjective used to describe the plug-in software modules 134. To simplify the use of terminology throughout this specification, the adjective of "merchant" will be used to describe plug-in software modules. However, this should not be read to limit the plug-in software modules 134 as only being suitable for use by requesting parties who are merchants. Furthermore, MPI will be used as the acronym for merchant plug-in software module.

Validation server 136 verifies the digital signature of the card issuer used to sign the receipt returned by the account authentication system to the merchant during the payment transaction. In alternative embodiments, the functionality of validation server 136 may be included within MPI 134, thus eliminating the need for a separate validation server 136. Validation server 136 is operated by the merchant, the acquirer, or by a service organization.

In some embodiments, the account authentication system can interoperate with other account holder applications, such as electronic wallets, and the service can operate compatibly with electronic commerce mark-up language (ECML software). The account authentication system also provides capabilities to implement dispute resolution procedures. For instance, a merchant can retain sufficient information to provide proof of account holder authentication for the purposes of dispute resolution and charge-backs.

Set-Up and Registration Description

The description will now provide further detail for setting up the account authentication system for both payment and non-payment transactions. First, the procedures required to set up the various system participants such that they can use the account authentication system will be explained. Then the account holder's process for registering with the account authentication system will be explained. After these phases are described, explanation will be provided as to the actual authorization of payment transactions.

Setting up the account authentication system involves set up procedures for all the participants within the system. The set-up procedures are generally the same for both the authorization of payment and non-payment transactions. These participants include entities such as merchants or other authentication requesters, financial institutions or other trusted parties, and account holders.

Requestors, such as online merchants, who sign up with the account authentication system receive plug-in software modules such as plug-in software module 182 in FIG. 1 and module 134 in FIG. 2. The plug-in software module should be specific to the computing platform and server software used by the requester. Requestors, such as financial institutions, participating within the account authentication system will provide their service logos and marketing designs to be incorporated into their customized enrollment site template. Third parties that are acquiring banks should also provide merchants with a service organization certification authority (CA) root certificate, a service organization certification authority SSL certificate for client authentication, and integration support.

Before a trusted party can be set up to use the account authentication system, they should obtain and install a copy of all account authentication system hardware and software specified in the trusted party domain. Trusted parties such as issuer financial institutions will also provide identity authentication policies and participating bank identification number (BIN) information to the account authentication system to be used in the account holder identity verification processes. Optionally, the Issuer can provide the account holder authentication information to the account authentication system for pre-loading into account holder file 118. Pre-loading facilitates large volume support of account holders. For example, when a trusted party desires to activate all or most of its account holders for account authentication services, the trusted party can send personal identification numbers (PIN numbers) to all of its account holders. The PIN number can then be used by each account holder to access his or her preloaded passwords. In this manner, the enrollment process is expedited because each account holder need not go through the formal enrollment process. After the account holders use their preloaded password for the first time, the account holders have the option of designating a new and easier to remember password.

Account holder authentication information includes information such as business identification, country code, card account number, card expiration date, account holder name, issuer-specific authentication data specified in the "participating BIN" data (e.g., mother's maiden name), and other information such as billing address, shipping address, social security number, telephone number, account balance, transaction history, and driver license number. Trusted parties should also provide account number ranges for their card account portfolios and ACS IP addresses (URLs) to the directory server. With respect to payment applications of the account authentication system, the service can be offered through bank branded web sites, which allow for account holder registration.

Figure 3:
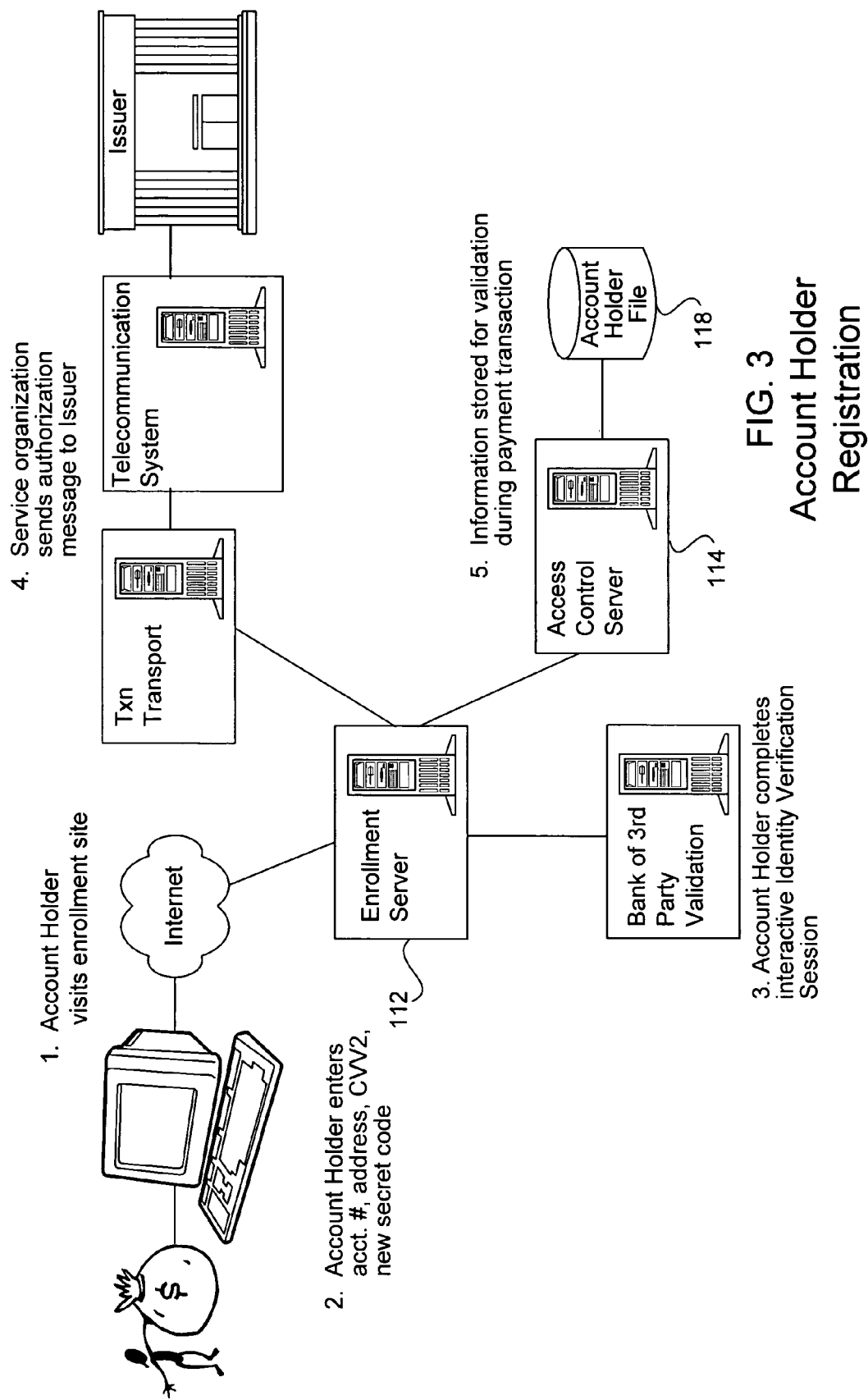
FIG. 3 illustrates the process through which an account holder registers with the account authentication system according to one embodiment of the present invention.

FIG. 3 illustrates the process through which an account holder registers with the account authentication system according to one embodiment. As shown in step 1, account holders visit an enrollment server Internet web site maintained by a trusted party, for example, an issuer financial institution. Account holders register with the account authentication system by registering their account numbers. For example, with payment transactions, an account holder can register his or her credit, check, or debit card account number. With respect to non-payment transactions, an account holder can register an account number held with an insurance or brokerage company. Account holders can register one or more cards.

At step 2 the account holder enters information such as a primary account number (PAN), name and card expiration date. At this point, the account holder can also enter additional information. For instance, address, e-mail address, shopper identification, an account verification value, account holder-specific password, and issuer-specific authentication information can also be entered. This information can be entered in a page at the enrollment web site such as page 300 shown in FIG. 4.

After the account holder enters the requested information at enrollment site 108, the account authentication system verifies that the account holder's PAN falls within a card range that is registered by the trusted party in directory server 128 of interoperability domain 104. Account holder identities can be verified using various methods. First, as just mentioned, account holder identities can be verified through a requestor authentication database or through the trusted party's own authentication database. Additionally, verification can be performed by using a file of approved account holders 120 provided by the trusted party, by transmitting status check authorizations to the trusted party, and by comparing responses to pre-loaded information provided by financial institutions.

If the PAN is not within an enrolled card range, the enrollment is rejected and the enrollment process is terminated. In a payment transaction, if the PAN is within an enrolled card range, an authorization for one dollar (or any other nominal amount) will be submitted through a service organization payment network, such as VisaNet, to the issuer financial institution. The authorization of the one-dollar transaction allows the issuer to verify the card account status, the address using the Address Verification Service, and the Account holder Verification Value 2 (CVV2). The CVV2 is a three-digit number printed on the signature strip on the back of the payment cards. In a non-payment transaction, a one-dollar transaction is not required if the PAN is with the enrolled card number range.

At step 3 the account holder is prompted for additional authentication information to verify the account holder's identity in an interactive, real-time, online session. In some embodiments, the account holder can also be requested to enter a password and a "hint question and response" pair that will be used to authenticate the account holder during the authentication transaction.

As shown in step 4, when the account holder's identity is verified and the appropriate responses are returned, an authorization message is sent to the issuer financial institution. Then at step 5, enrollment server 112 passes account holder information to ACS 114 to set up records in account holder file 118. Account holder file 118 can store information such as: financial institution BIN numbers, account numbers, expiration dates, first and last names, driver's license numbers, billing addresses, social security numbers, account holder passwords, account holder password questions, account holder password answers, account holder email addresses, requestor identity scores, and other information.

In some embodiments, during the registration process, the account holder can be asked to enter a phrase, called the personal assurance message (PAM), that is recognizable to the account holder. PAM is later presented to the account holder by the trusted party during an authentication process. Since only the trusted party knows the account holder's designated PAM, the account holder can be assured that a dialog window used with the account authentication system was delivered from the trusted party. An example PAM is, "the sky is blue."

It should be noted that account holders require no new client software or devices to use the authentication system. In a preferred embodiment, the account holder registration process utilizes security protocols such as SSL channel encryption to protect data transmitted across the Internet between the account holder and the enrollment server.

Also, during the registration or enrollment process, each trusted party could display its own "terms of use" and/or "data privacy policy." Each trusted party has the ability to require registering account holders to either accept or decline the terms and policies in order to complete the registration process. The version numbers of the "terms of use" and/or the "data privacy policy" accepted by each account holder should be saved by the trusted parties.

Payment Transaction Description

Figure 5:
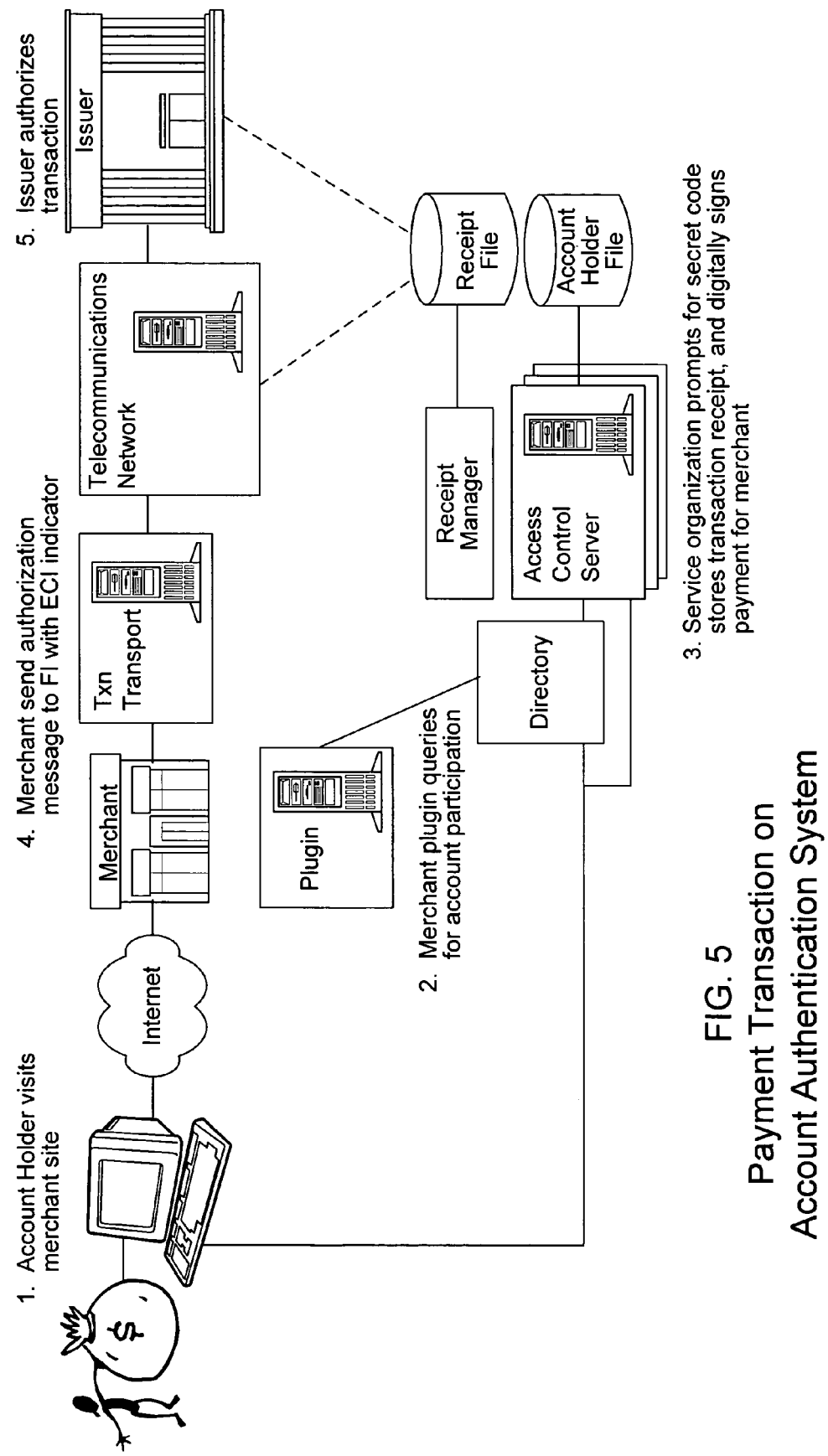
FIG. 5 describes an authenticated payment transaction on the account authentication system where an account holder uses a computer that is connected to the Internet.
Figure 6:
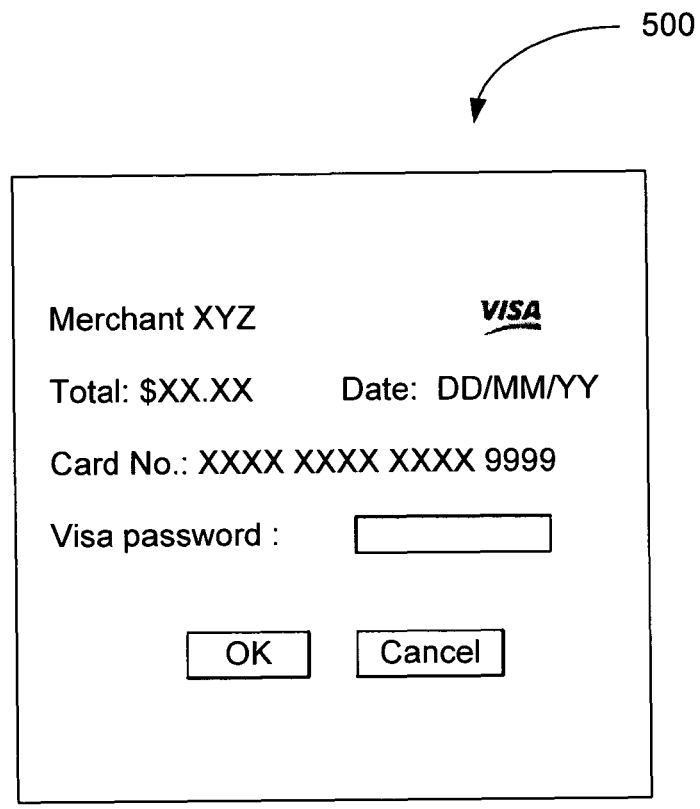
FIG. 6 illustrates an exemplary window that prompts the account holder for his or her password.

After all participants are set up and the account holders are registered, account authentication is performed. FIG. 5 describes an authenticated payment transaction using the core account authentication system where an account holder uses a computer that is connected to the Internet. In step 1 of FIG. 5, an account holder visits a merchant's electronic commerce site on the Internet. The account holder can also be referred to as a cardholder since in a payment transaction the most common type of account held by an account holder will be some sort of credit, debit, or check card account. After the account holder selects the products or services he or she wishes to purchase, the account holder begins the checkout process, completes the checkout form, and then clicks on a "buy" button.

After the "buy" button is selected as shown in step 2 of FIG. 5, the MPI is activated and then performs a verification process to determine whether the account holder's specific account is registered with the account authentication system. There are various methods by which the MPI can determine if the account holder is registered with the account authentication system. For instance, a two-step process in which the directory server and then the ACS associated with the account holder is checked, a process where only the ACS is checked, and a method in which the merchant can check a cache memory containing the same information held in the directory server can be used.

A description of the two-step process will now be provided. Reference to FIG. 2 will be made during this description. In the first step, the MPI identifies the card account number and queries the directory server 128 to verify that the account number is within a range of numbers associated with an issuer bank that is a participant of the account authentication system. If the account number does not fall within a range of account numbers defined on the directory server 128, then the issuer and thereby its account holder are not registered. In this case the merchant is notified that the account number is not registered and the MPI 134 returns control of the transaction back to the merchant storefront software. At this point, the merchant storefront software can proceed with the transaction, as it normally would, refuse further service to the account holder, or proceed with alternative payment methods.

On the other hand, if the account number is determined to be within a range of account numbers present in directory server 128, then the second step of the verification process begins. The second step of the verification begins when directory 128 sends the account number to an ACS to determine if the account number is enrolled. If the card is not enrolled, the enrollment process is terminated. If the ACS indicates that the card is enrolled, the ACS via the directory server returns its URL Internet address to the MPI. The MPI then invokes the ACS via the account holder client device and its resident browser. Once again it is noted that there can be multiple ACS's in the account authentication system.

A second method of checking to see if the account holder is registered with the account authentication system is for MPI 134 to directly query ACS 114 without first querying directory server 128. The third method, as mentioned above, is for the merchant to have a cache memory containing the same information held at the directory server 128. In this manner the merchant can at least do a preliminary check.

It should be noted that there could be more than one physical directory server in the account authentication system. However, it is preferable that there be only one logical directory server. In other words, all of the directory servers should be consistent in that they contain the same information.

If the account holder is a participant in the account authentication system, ACS 114 displays a bank branded window to the account holder. The bank branded window contains basic payment transaction information and prompts the account holder for his authentication password or token. See FIG. 6 for an exemplary window 500 that prompts the account holder for his or her authentication password. The account holder enters his or her authentication password and ACS 114 verifies the authentication password. The size and layout of window 500 varies depending upon the parameters of the device used by the account holder. As is common today, the account holder can be given a certain number of attempts to correctly enter the authentication password. If the account holder is unable to correctly enter the authentication password, then the account holder can be prompted with the hint question that was established during the account holder's registration process. Preferably, the account holder is given one chance to enter the correct answer in response to the hint question.

The payment authentication continues if the correct authentication password or token is immediately entered or the account holder provides the correct response to the hint question. The ACS then proceeds to digitally sign a receipt using the issuer's signature key or a service provider's key. This receipt will contain the merchant name, card account number, payment amount, and the payment date. In some embodiments, the receipt is a copy of the Payment Authentication Response (PARes) message, or a message having at least some of the information fields copied from the PARes message. The authentication history server 130 stores the following transaction data: merchant name, merchant URL, card account number, expiration date, payment amount, payment date, the issuer payment signature and the account holder authentication verification value. The ACS then redirects the account holder back to the MPI through the account holder browser. At this point, the ACS also passes to the merchant the digitally signed receipt and the determination as to whether the account holder has been authenticated. The validation server 136, in the acquirer domain 106, is used by the MPI 134, to verify the digital signature used to sign the payment receipt. After verifying the digital signature, the account holder is deemed "authenticated." In some embodiments, after the transaction is completed, the account holder will also have the ability to re-register his or her card account and create a new password to be used for future online purchases.

After the account holder is authenticated in step 3, step 4 initiates the process for authorizing the specific account holder's account. Authorization refers to the process of verifying that an account holder has adequate credit and is in good standing for a specific purchase. In contrast, authentication refers to the process of verifying the identity of an account holder. In step 4 the merchant uses the MPI to send an authorization message to a payment network such as VisaNet. The payment network in turn, forwards the authorization message and an electronic commerce indicator (ECI) to an issuer financial institution. The authorization message is a message as is commonly known in the art. The authorization message is sent to the issuer so that the issuer financial institution can verify to the merchant that a specific account is in good standing and has adequate credit line for the requested purchase amount of the payment transaction. The ECI indicates that the transaction was completed over the Internet and indicates that level of message security (i.e., channel encryption (SSL), in the clear) and authentication used.

In alternative embodiments, the merchant is capable of providing additional information along with the authorization message. For instance, the following information can also be sent: a flag indicating if the account holder was successfully authenticated, account information, digital signatures, a account holder verification value 2, a transaction identifier, an offline PIN authenticated by chip card Europay, Mastercard, and Visa (EMV) cryptogram, and the necessary fields to provide the merchant with guaranteed payment. After the issuer financial institution processing of the authorization transaction is complete, control of the payment transaction is then returned to the merchant's storefront software via the payment network. The issuer then returns the authorization response via the payment network to the merchant. In step 5 of FIG. 5, the issuer financial institution will either authorize or decline the transaction. In some embodiments, the authorization messages can be batched and sent in a group at a later time. The authentication information is also included in the batch authorization messages.

The transaction identifier is created by the ACS which authenticated the account holder and is a unique value for a given payment card and a specific payment transaction from that card. Issuers use transaction identifiers to uniquely identify authenticated payment transactions for various purposes such as for when subsequent disputes occur. Note that the transaction identifier can take on many forms of data that are suitable for uniquely identifying records such as those relating to a specific online transaction. In one some implementations, such as payment transactions, transaction identifiers are card authentication verification values (CAVV). In the following description, a transaction identifier may be referred to as a CAVV, however it should be kept in mind that various types of transaction identifiers can be also be utilized.

Access control server (ACS) 114 is capable of various other functions. For example, the ACS can deactivate registered accounts from the database. Accounts can be deactivated manually, by the account holder, or by the issuer. ACS 114 can also provide a simplified renewal registration process when the account holder receives a replacement card. ACS 114 can support multiple users of the same registered account with unique access control information. When providing a user with a connection to ACS 114 for payment transactions or account updating, ACS 114 can validate the user as an authorized account holder of the registered account through one or more of the following mechanisms: pass phrase, digital signatures, an online PIN number, or and off-line PIN authentication by chip card EMV cryptogram.

Merchant 132 can interoperate with existing systems where the merchant has the account holder account information on file, interoperate with existing merchant authorization and clearing systems, support third parties who provide services to multiple merchants, support a variety of payment interfaces between the merchant and the acquirer, and minimize the mandatory impact to payment network authorization messages from the acquirer when setting the value of the electronic commerce indicator (ECI).

One method for routing transactions from the merchant to an ACS is to have a directory that provides the address of the server based on the account holder account number. In such a method, requests for routing information are only acceptable from authenticated merchants. When activity from a merchant exceeds normal activity, then account authentication system can deny access to a merchant whose acquirer indicates that such access is no longer valid. This could be the case when merchant fraud is deemed probable. Merchant authentication to the account authentication system can be deployed, but deployment is not required. Merchant authentication can help minimize merchant fraud.

Figure 7:
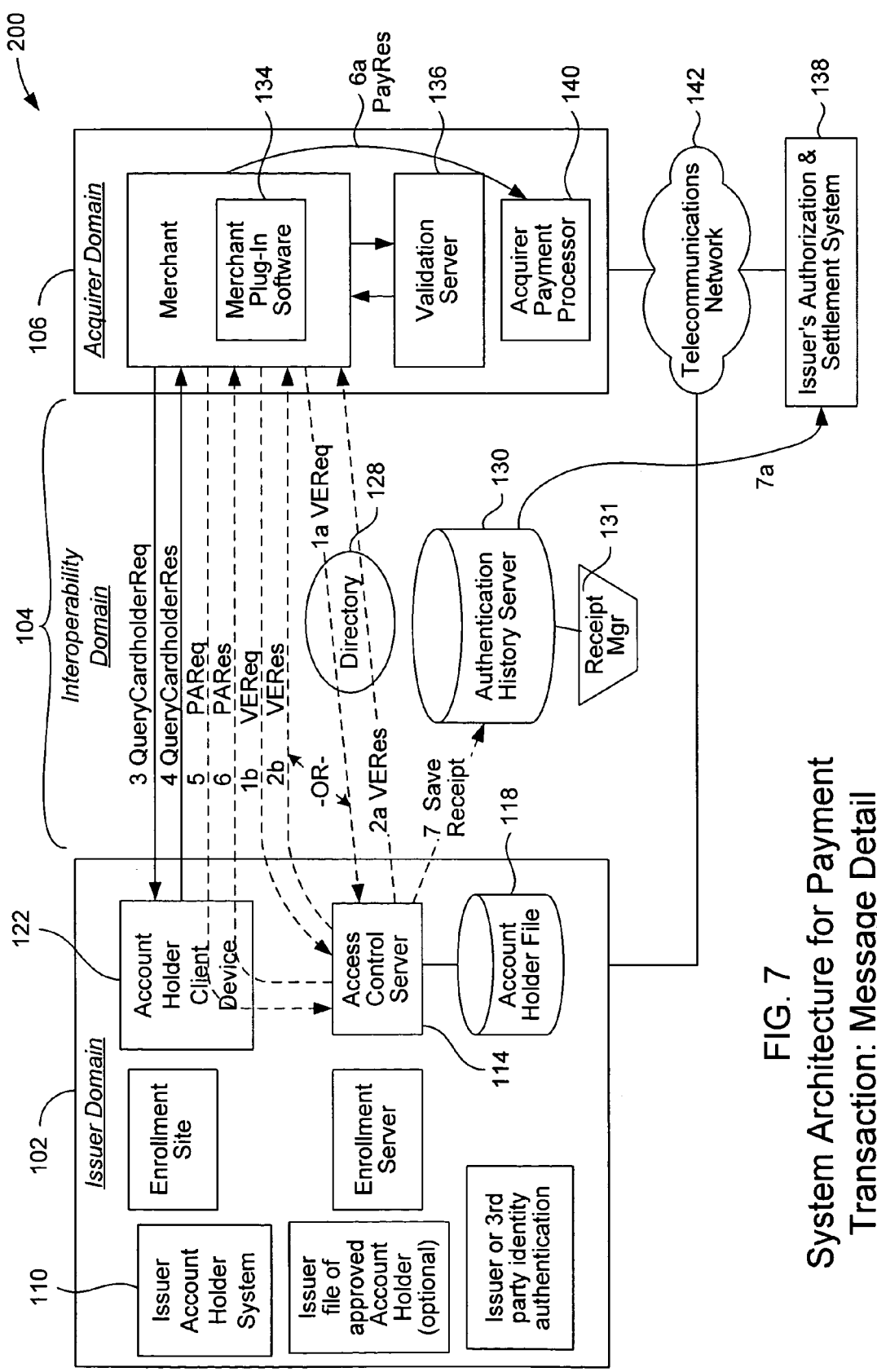
FIG. 7 illustrates exemplary messages that are sent during the payment transaction superimposed over the account authentication system where a consumer uses a computer that is connected to the Internet.

FIG. 7 illustrates specific messages that are transmitted during a payment transaction using the core account authentication system where a consumer uses a computer that is connected to the Internet according to one embodiment. The messages of FIG. 7 are superimposed over the payment system architecture as shown in FIG. 2. It should be understood that even though the messages and the data fields within each of the messages are given specific names, these names do not affect the performance of the authentication protocol. Therefore, different names can be assigned to the messages and data fields discussed below. Also note that in alternative embodiments of the invention, the specific messages described in FIG. 7 can be altered or omitted and/or additional messages can be added without affecting the overall objectives of the authentication process. Various messages can be altered, added, or omitted for various purposes such as for adding functionality and streamlining communications. Also note that the message flow in the processes described throughout this specification can vary in alternative embodiments for reasons such as those just described.

As described above, the payment transaction begins when an account holder visits a merchant website via a browser and selects items to purchase. The merchant's payment system will ask the account holder to enter his or her payment information. Generally, entry of the payment information should occur in a secure environment, for example, through the use of SSL encryption protocol. When the account holder indicates that he or she is ready to finalize the transaction, the merchant's payment system invokes MPI 134. Then as shown by line 1*a*, MPI 134 checks directory server 128 for the specific URL of the ACS that may contain the account holder's PAN to validate that the account holder is enrolled in the service. Alternatively, MPI 134 checks its own cache memory that contains this information. MPI 134 can also check ACS 114 to verify that account holder's PAN is enrolled with the account authentication system. In the case that MPI 134 can check its own cache, MPI 134 should have the ability to copy the contents of directory 128 into its local cache. If this capability is used, the merchant can determine immediately from its cache if the account is part of an enrolled range. If the merchant implements this capability, the contents of the cache should expire and be refreshed at least every 24 hours. The cache should be requested when the MPI 134 is loaded and at regular time intervals thereafter.

MPI 134 searches for the PAN by formatting a Verify Enrollment Request (VEReq) message using the account holder PAN. If not already established, MPI 134 will establish a secure connection with and authenticate itself to directory server 128 or ACS 114. MPI 134 will search for a card range entry that corresponds to the account holder PAN at various locations.

After MPI 134 conducts the search, the VEReq message is transmitted to ACS 114 either directly, as shown by line 1*b*, or after first passing through directory server 128, as shown by line 1*a*. When the VEReq message is transmitted to ACS 114 via directory server 128, directory server 128 searches for a record corresponding to the account holder PAN contained in the VEReq message. On unsuccessful match, directory server 128 will format a Verify Enrollment Response (VERes) message with no URL value(s) and set the value of Status of PAN Enrollment or VERes-Status to "N." The VERes message is then returned to the MPI. On the other hand, upon successful match, directory server 128 will, if not already established, establish a secure connection with and authenticate itself to the ACS URL. Then, the VEReq message is forwarded to the ACS URL. If that URL is not available, the MPI should proceed to the next ACS URL value (if available), and allow for up to a maximum of up to five ACS URL's to be searched. Of course, the number of URL's attempted is variable. If unsuccessful on all attempts, a VERes message is returned to the MPI with VERes-Status set to "N" to indicate to the merchant that the payment transaction cannot be processed using the account authentication system.

After the VEReq message is received by ACS 114, the ACS accepts the account holder PAN from the VEReq message and validates it against account holder file 118. ACS 114 then formats a VERes message. In the case where a successful match occurs, the ACS sets the Status of PAN Enrollment to "Y," creates a single use proxy PAN, which ACS 114 will internally associate with the PAN, and populates the URL field(s) in the VEReq message. In the case of an unsuccessful match, the ACS sets the Status of PAN Enrollment to "N."

Then, as shown by line 2*a*, the ACS returns a VERes message back to the MPI through directory server 128. For the case when a VEReq message is transmitted directly to the ACS, the VERes message is transmitted directly back to the MPI as shown in line 2*b*.

Caching the data of directory server 128 within MPI 134 can be facilitated by utilizing a CRReq and CRRes message pair. The CRReq message is sent from the MPI to the directory server and requests the list of participating card ranges, in order for the MPI to update its cache. The CRRes message is the response containing the participating ranges.

In some embodiments, the account authentication system checks to see if the account holder client device has distributed authentication capabilities by using a QueryAccount holderReq and QueryAccount holderRes message pair. The MPI will format and send a query, the QueryAccount holderReq message, to account holder client device 122 to determine if a distributed account authentication account holder module is resident. Sending of the QueryAccount holderReq message is shown in FIG. 7 by line 3. If any distributed authentication options are returned in the QueryAccount holderRes message, the MPI will communicate directly with the account holder client software to perform the authenticated steps. Sending of the QueryAccount holderRes message is shown in FIG. 7 by line 4. Additionally, by using the QueryAccount holderReq and QueryAccount holderRes messages, the VEReq and VERes messages described below may be eliminated. Account holder client software could be deployed with issuer's ACS URL embedded in the software. The MPI will complete the QueryAccount holderReq and QueryAccount holderRes messages first. If account holder client software is detected, the PAReq message could be sent to the ACS or the account holder client software without having to conduct the VEReq and VERes messages.

If the VERes-Status has a value not equal to "Y," then the merchant is notified that the payment transaction cannot be processed using the account authentication system. However, if the VERes-Status has a value of "Y," then MPI 134 will format a payer authentication request message (PAReq). MPI 134 will send the PAReq message via the account holder client device browser to the issuer's ACS server, as is shown by line 5.

After the MPI passes the PAReq message to the issuer's ACS, the ACS displays a window to the account holder. The window displays the payment details contained in the Payer Authentication Response (PARes) message in addition to other items such as: a Issuer's logo, a service organization mark or brand logo, merchant name, merchant location (URL), total purchase amount and currency, purchase date, card number, installment/recurring payment terms, order description or link to description, special terms and conditions of sale or link to this information, personal assurance message (PAM), and prompt for the account holder's password or any other type of authenticating token.

The ACS will then prompt the account holder to enter the appropriate password. The ACS accepts the account holder input and validates it against account holder file 118. The account authentication system will allow, for example, a number of unsuccessful attempts (e.g., three attempts) to enter the correct password. Of course, the number of attempts allowed can be varied. After the final unsuccessful attempt, the account authentication system may display a hint question. The account holder will need to enter the correct hint question response. The hint question associated with the account holder is then displayed. The account holder is provided at least one attempt to enter the correct response. If the account holder provides an incorrect response, the merchant can be notified that a transaction using the account authentication system cannot be completed. If the account holder provides the correct response, the transaction should be treated as if the password was matched. Note that if there is more than one entry for an account number, the various account holder names are displayed in a drop down window. The account holder can then select his or her name.

Upon matching of the password, the ACS generates and digitally signs a PARes message. The ACS also generates and sends a SaveReceipt message to the authentication history server 130 and receipt manager 131, as is shown by line 7. As shown by line 7a, the SaveReceipt message may also be passed from authentication history server 130 to the issuers authorization and settlement system 138 to allow the issuer to match up the payment authorization request with the payer authenticated transaction in real time. Sending the SaveReceipt message to the issuer's authorization and settlement system 138 allows the issuer to determine simultaneously if the authorization request is for an authenticated purchase. The ACS will then re-direct the signed PARes message back to the MPI, as is shown by line 6.

After the signed PARes message is transmitted back to MPI 134, MPI 134 is reactivated. If the authentication status is a "Y," MPI 134 sends the PARes message to the validation server 136. In the case that the validation server functions are provided by MPI 134, MPI 134 validates the PARes message signature and returns the result of the signature validation. If the signature cannot be validated, MPI 134 will notify the merchant that the transaction cannot be processed using the account authentication system. If the authentication status is a "N," the merchant should send a prompt to the account holder asking for additional information, request the account holder to use a different payment card or form of payment, or process the payment transaction as a non-authenticated payment transaction.

In the case that acquirer domain 106 contains a validation server, the validation server 136 validates the signature on the PARes message. Validation server 136 then returns the result of the signature validation to MPI 134. If the signature cannot be validated, MPI notifies the merchant that the transaction cannot be processed using the account authentication system. On the other hand, if the signature is validated, the merchant proceeds with an authenticated payment authorization. The PARes message may also be passed from the merchant to its acquirer payment processor 140 as shown in line 6a. The PARes message may then be passed from the acquirer through a telecommunications network 142 to the issuer. Thus, the payer authentication results are made available to the issuer as part of the standard payment authorization process.

Now the security issues related to the various channels of transmission will be discussed. As a base line, all the channels of transmission are preferably encrypted using 128-bit SSL. The channel between the account holder and the merchant includes two channels. The merchant should secure the connection that is used when the account holder enters the payment information by using an SSL certificate obtained from a service organization-approved certificate authority. The merchant should also secure the connection used to transport the PARes message from the account holder to the MPI by using an SSL certificate obtained from a service organization-approved certificate authority.

The channel between the account holder and the ACS should be encrypted by the ACS by using an SSL certificate obtained from a service organization-approved certificate authority. This channel is used for two purposes. First to send the PAReq message from the MPI to the ACS, and secondly to send the signed PARes message from the ACS to the account holder.

The channel between the account holder and the enrollment server should be encrypted by the enrollment server using an SSL certificate obtained from a service organization-approved certificate authority. This channel is used to accept the account holder enrollment information.

The channel between the merchant and the directory server, and between the directory server and the ACS server should be secured through a service organization-issued SSL encryption certificate in order to protect the PAN data contained in the VEReq and VERes messages and the ACS URL address contained in the VERes message.

The channel between the ACS to the account holder should be encrypted to protect the prompt for the account holder's password and the account holder entered password. This channel should be protected with an SSL certificate obtained from a service organization-approved certificate authority.

For most transactions the Payment Authentication Request and Response messages include fields that include but are not limited to Message Version Number, Merchant Identifier, Merchant Country Code, Order Number, Purchase Date, Purchase Amount, Transaction Status, and Purchase Terms and Conditions. Also, the QueryAccount holderRes Message typically includes fields such as but not limited to Message Version Number, Merchant Name, Order Number, Purchase Date, Purchase Amount, Card Expiration Date, and Transaction Stain. These messages can be in XML (Extensible Markup Language) format.

In non-purchase authentication transactions, the Payment Authentication Request, Payment Authentication Response, and QueryAccount holderRes messages can include message extension fields. As is well known in the art, message extension fields are data fields that define additional elements with respect to the message to which the extension is attached. These additional elements can be used to further facilitate specific transactions, including non-payment transactions.

Account Authentication Process with Value Adding Component

FIG. 8 illustrates an exemplary system architecture and a set of message flows involved with online account authentication that includes a value-adding aspect. The value-adding aspect involves sharing information collected throughout the account authentication process with a value-adding party. Such information relates to the presenter and can be collected by the issuer or trusted party and the requestor. The presenter information is valued for its high integrity because it served as the basis for authentication of presenter 122. The presenter information can be marked with a transaction identifier, which identifies a specific online transaction and states that the information originated from the authentication process of the present invention. The value-adding information can be used by value-adding party 196 for various purposes related to shipping, follow-on sales, security checks, and work flow management, just to name a few. All of the parties involved can benefit from sharing the presenter information and each party can agree as to how they can help each other gain the benefits. For instance, a requestor and a value-adding party can agree to additional contractual terms based upon the sharing of the presenter information.

The authentication process that includes sending presenter information to a value-adding party 196 will now be described with reference to FIG. 8. FIG. 8 will be described as based upon a payment transaction. Following such description, FIG. 8 will also be described as based upon non-payment transactions. FIG. 8 represents the messages of FIG. 7 in a simplified form.

The account authentication system architecture in FIG. 8 includes an issuer domain 102, an interoperability domain 104, an acquirer domain 106, and a value-adding domain 107. Issuer domain 102 includes presentor 122, ACS 114, and issuer 190. Presentor 122 represents the human presentor and the presenter client device, for example, a computer terminal or a mobile computing device. Issuer 190 represents a card-issuing bank that is capable of issuing a payment card to presentor 122. Interoperability domain 104 includes a Visa directory 128, which in this case is a directory that is controlled by Visa, an authentication history server 130, and VisaNet 194. Acquirer domain 106 includes a requestor 132, a MPI 134, and the acquiring bank 192. Requestor 132 can be various types of parties, however, since requestor 132 is commonly a merchant, the term merchant can be used in place of requestor. Value-adding domain 107 includes a value-adding party 196 and a value-add control server 198.

The payment transaction of FIG. 8 is described through the directional arrows that are numbered 1-14. The payment transaction begins at step 1 when a presentor browses at a merchant website, adds items that he or she wishes to purchase to a shopping cart, and then finalizes the purchase. At this point, merchant 132 has the necessary data, which includes the PAN, expiration date, and address information, to proceed with the payment transaction.

At step 2, a MPI 134 sends the presentor's primary account number (and user device information, if applicable) to Visa directory server 128 to check if the presentor PAN is enrolled with the account authentication system. This process occurs after the final "buy" click confirmation from the presentor during the merchant checkout process. After the "buy" click is made, the merchant's software invokes MPI 134 to format a Verify Enrollment Request (VEReq) message. MPI 134 determines if it currently has a secure connection with Visa directory server 128. If a secure connection has not been established, MPI 134 establishes an SSL connection with Visa directory server 134. If the Visa directory server configuration indicates that merchant 132 has been issued an SSL client certificate, Visa directory server 128 will require merchant 132 to present the SSL client certificate during the establishment of the SSL session. After the secure connection has been established, MPI 134 posts the VEReq message to Visa directory server 128. It is noted that in various embodiments, the "buy" click confirmation can be completed using various purchase order confirmation processes.

The VEReq message, along with any other message sent during the authentication process, can include an indicator that denotes that the online authentication process will also involve the sharing of presentor information with a value-adding party.

At step 3, if Visa directory server 128 determines that the PAN is in a participating card range, then Visa directory server 128 queries an appropriate ACS, such as ACS 114, to determine whether authentication (or proof of authentication attempt) is available for the PAN. This process occurs after Visa directory server 128 receives the VEReq message from MPI 134.

In order for Visa directory server 128 to verify that the PAN is in a participating card range, Visa directory server 128 validates the syntax of the VEReq message and returns an Error if validation fails. Visa directory server 128 validates the VEReq message data to ensure that certain requirements are met. First, the Acquirer BIN should represent a participating acquirer. Secondly, the Merchant ID should represent a participating merchant of the Acquirer identified by Acquirer BIN. Thirdly, if the Visa region of the Acquirer requires a merchant password for the account authentication service, then a value for the password should have been received and the password should be valid for the combination of Acquirer BIN and Merchant ID. If any of these requirements are not met, then Visa directory server 128 formats a Verify Enrollment Response (VERes) that includes a PAN Authentication Available set to "N" and an Invalid Request message. Note that this VERes does not contain the data fields of Account Identifier, ACS URL and Payment Protocols. After Visa directory server 128 returns the VERes message to MPI 134, the payment transaction can proceed in a variety of manners. For instance, the payment transaction can come to a complete end, the payment transaction can proceed as a non-authenticated transaction, or the presentor can attempt to use a different account number.

Visa directory server 128 searches for a record specifying a card range that includes the Presentor PAN that was received in the VEReq message. If the Presentor PAN is not found, then Visa directory server 128 formats a VERes message that includes a PAN Authentication Available set to "N" and does not include the data fields of Account Identifier, ACS URL, Payment Protocols, and Invalid Request. Then Visa directory server 128 returns the VERes message to MPI 134 and the account authentication again comes to a possible stopping point as will be described below.

Assuming the Presentor PAN is found in Visa directory server 128, Visa directory server 128 determines whether it currently has a secure connection with an appropriate ACS. Visa directory server 128 establishes an SSL connection with the ACS if a secure connection had not already been established. The SSL client certificate of Visa directory server 128 and the server certificate of the ACS should be presented and validated during establishment of the SSL session. If the first URL attempted is not available, each successive URL value (if provided) will be attempted. Visa directory server 128 can attempt to connect to up to four alternate URLs that are optionally configured for each ACS. If Visa directory server 128 cannot connect with a URL on each of its attempts, Visa directory server 128 formats a VERes message that includes PAN Authentication Available set to "N" but does not include the data fields of Account Identifier, ACS URL, Payment Protocols, or Invalid Request. Then Visa directory server 128 returns the VERes message to MPI 134 and brings the account authentication process to a possible stopping point.

After a successful connection with a URL is made, Visa directory server 128 removes the Password field from the VEReq message and forwards the message to the ACS URL.

At step 4, ACS 114 determines if authentication for the PAN is available and then indicates to Visa directory server 128 the determination. This process occurs after the ACS receives the VEReq message via Visa directory server 128. ACS 114 validates the syntax of the VEReq and returns an Error if validation fails. Note that when it is not possible to authenticate a payment transaction, it is sometimes possible to provide a proof of authentication attempt instead. ACS 114 uses the Presentor PAN from the VEReq message and queries a presenter database located within ACS 114 to determine whether the presentor is enrolled. If the PAN is not found, ACS 114 formats a VERes message including a PAN Authentication Available set to "N" and does not include the data fields of Account Identifier, ACS URL, Payment Protocols, and Invalid Request. ACS 114 then sends the VERes message to Visa directory server 128.

At step 5, Visa directory server 128 forwards the decision of ACS 114 to MPI 134. From the point of view of Visa directory server 128, this process occurs after Visa directory server 128 forwards the VEReq message to the ACS URL. From the point of view of ACS 114, this process occurs after ACS 114 sends the VERes message to Visa directory server 128.

Visa directory server 128 reads the VERes message, which contains the corresponding VERes or Error. Visa directory server 128 validates the syntax of the VERes message and returns an Error to ACS 114 if validation fails. If the message received from the ACS is syntactically correct, Visa directory server 128 forwards the VERes or Error to MPI 134. If the message received from ACS is not syntactically correct, Visa directory sever 128 formats a VERes message that includes a PAN Authentication Available set to "N" and that does not include Account Identifier, ACS URL, Payment Protocols, or Invalid Request. Visa directory server 128 returns the VERes message to MPI 132 and possibly stops the account authentication process. From the point of view of MPI 134, this process occurs immediately after MPI 134 posts the VEReq message to Visa directory server 128. From the point of view of Visa directory server 128, it occurs immediately after the Visa directory server forwards the VERes message to the MPI. MPI 134 reads the response, which contains the corresponding VERes or Error. If an Error message is received, the account authentication process possibly stops.

At the points at which the account authentication possibly comes to an end for the various reasons mentioned above, the merchant could proceed with a normal payment authorization using the available information from the checkout process. In this case, the merchant payment system should process the transaction as an unauthenticated electronic commerce transaction, which is out-of scope to this document. Note that the Electronic Commerce Indicator should be set to a value corresponding to the authentication results and the characteristics of the checkout process. If the merchant is unable to process an authenticated transaction using the account selected by the presenter during the checkout process, the merchant can either abandon the transaction or give the customer the option of selecting an alternate account. If an alternate account is selected, the authentication process can be repeated.

In an alternative embodiment, the need to query the Visa directory server to verify a presenter's participation in the account authentication system for each payment transaction (steps 2-5) can be avoided by copying the contents of the Visa directory server into a local cache memory device at merchant 132. If this capability is used, merchant 132 can determine immediately from the cache if the account is part of an enrolled range. This alternative technique of using a local cache at merchant 132 begin with MPI 134 formatting a Card Range Request (CRReq) message and sending it to Visa directory server 128. If this is the first time the cache is being loaded (or if the cache has been flushed and needs to be reloaded), a Serial Number element is not included in CRReq, which will result in Visa directory server 128 returning the entire list of participating card ranges. Otherwise, MPI 134 should include the Serial Number from the most recently processed CRRes, which will result in the Visa directory server only returning the changes since the previous CRRes. A serial number is a value that defines the current state of a card range database at Visa directory server 128. Visa directory server 128 provides the serial number to MPI 134. The specific value is only meaningful to the specific Visa directory server that returns it.

Visa directory server 128 validates the syntax of CRReq and returns an Error if validation fails. Visa directory server 128 formats a Card Range Response (CRRes) containing the participating ranges and sends it to MPI 134. Visa directory server 128 includes a serial number in the response. MPI 134 should retain this value to be included with the next day's CRReq message. MPI 134 validates the syntax of the CRRes and should send an Error to Visa directory server 128 if validation fails. MPI 134 updates its local cache. The list should be processed in the order returned with ranges being added or deleted as indicated by the Action element. Note, that if CRRes indicates an error condition regarding the Serial Number, the MPI should clear its cache and submit the CRReq without a Serial Number.

When authentication is available for the presenter's PAN, MPI 134 sends a Payer Authentication Request (PAReq) message to ACS 114 via presenter client device at 122. Step 6 represents the PAReq message being sent to presenter client device 122. This process occurs immediately after MPI 134 receives the VERes message from Visa directory server 128. MPI 134 validates the syntax of the VERes and should send an Error to Visa directory server if validation fails. MPI 134 formats a PAReq message that includes the Account Identifier received in VERes.

This embodiment of the authentication process involves the sharing of presenter related information between merchant 132 and issuer 190. Each of issuer 190 and merchant 132 can collect a wide range of information about the presenter over a single or multiple transactions. Such information can include information concerning a certain presenter's purchasing habits. Such information can be useful to various parties such as merchant 132, issuer 190, and value-adding party 196. Such customer information can be shared between merchant 132 and issuer 190 during the authentication process by inclusion of such information within the PAReq and PARes messages. Therefore, at step 6, merchant 132 can include within the PAReq message information that concerns presenter 122.

MPI 134 constructs a form containing the following fields: PAReq, TermUrl, which is the merchant URL to which the final reply should be posted, and the MD ("Merchant Data") field. The MD field contains merchant state data that should be returned to the merchant. This field is used to accommodate the different ways merchant systems handle session state. If the merchant system can associate the final post with the original shopping session without any further assistance, the MD field may be empty. If the merchant system does not maintain state for a given shopping session, the MD can carry whatever data the merchant needs to continue the session. Since the content of this field varies by merchant implementation, the ACS should preserve it unchanged and without assumptions about its content.

MPI 134 passes the PAReq through the presenter browser to the ACS URL received in the VERes, by causing the presenter browser to POST the form to the ACS. All connections are HTTPS to accommodate the presenter browser.

Step 7 represents the PAReq message being sent to ACS 114 from presenter client device 122. This process occurs after ACS 114 receives the post including the PAReq from MPI 134. The following description applies to the case where presenter authentication is performed using a password. Other methods, such as those that rely on applications on a chip card, may be used. ACS 114 validates the PAReq message and returns an Error if validation fails. If validation fails, then ACS 114 formats a PARes message with Transaction Status set to "N" and an Invalid Request.

In step 8, ACS authenticates the presenter using processes applicable to PAN. These processes include techniques such as but not limited to requesting a password or PIN that was previously established between issue 190 and presenter 122 and presenting a data challenge to the presenter. A data challenge for instance, can involve ACS 114 requesting that presentor client device 122 provide a specific data response that would authenticate the identity of presentor or presentor client device 122. In one scenario, an ACS 114 can request that a client presentor device create a specific cryptogram that would authenticate presenter 122. Alternatively, ACS 114 can produce a proof of authentication attempt. ACS 114 then formats a PARes message with appropriate values and then applies a digital signature to the response message. ACS 114 validates the password, data response, or cryptogram against the presentor database located within the ACS. ACS 114 also generates a transaction identifier, such as a CAVV, for each online transaction. Along with being associated with a specific online transaction, the transaction identifier is also associated with the customer information that is shared between merchant 132 and issuer 190.

At step 9, ACS 114 returns the PARes message to presenter client device 122. Information maintained by issuer 190 that concerns presentor 122 and the transaction identifier can be sent to merchant by inclusion within the PARes message.

ACS 114 constructs a form containing a PARes and an MD field. ACS 114 passes the signed PARes through the presentor's browser to the merchant's URL (TermUrl in the post from the MPI) by causing the presentor browser to POST the form to the MPI. In the process, the popup is closed and control is returned to the merchant's browser window.

At this point in time, ACS 114 can also send selected data to authentication history server 130. For instance, ACS 114 formats a Payer Authentication Transaction (PATransReq) message that is sent to authentication history server 130.

The presenter information held and/or transferred during the authentication process can be stored by each of merchant 132 and issuer 190. Each party can store a portion or its own entire set of customer information. Alternatively, a portion or all of the customer information can be stored within authentication server 130.

At step 10, presentor client device routes the PARes message to MPI 134.

At step 11, MPI 134 validates the digital signature placed on the PARes message by ACS 114. Validation of the digital signature can be performed by ACS 114 itself or by passing the PARes message to a separate validation server. The Validation Process validates the PARes signature using the Visa Root Certificate. If this is implemented using a separate Validation Server then MPI 134 sends the PARes to the Validation Process, the validation process validates the signature on the PARes using the Visa Root Certificate, and the validation process returns the result of signature validation to the MPI.

At step 12, merchant 132 proceeds with an authorization exchange with acquirer 192.

At step 13, merchant 132 uses a certain set of criteria to evaluate the customer information that it is in possession of. If the set of customer information satisfies the criteria, then the customer information and the transaction identifier is sent to value-adding party 196. The criteria can revolve around various issues that will determine if value-adding party 196 desires to receive the customer information. Such criteria will be described in more detail through the more detailed examples of how the authentication process operates.

At step 14, value-adding party 196 stores the customer information and the transaction identifier in a database, such as value-add control server 198.

Step 15 represents back and forth communication between value-add control server 198 and authentication history server 130 that can take place for various purposes. Such purposes include, for example, concluding a transaction between merchant 132 and value-adding party 196, dispute resolution, and data mining.

The following sections of the description will describe further details for various value-adding embodiments of the present invention.

Shipping Company as a Value Adding Party

The authentication system and process shown in FIG. 8 will now be described according to an embodiment where valuing-adding party 196 is a shipping company ("shipper"), referred to as shipper 200*a*. In this embodiment, presenter 122 purchases a product from merchant 132 that needs to be shipped to the presenter's residential or other mailing address. The presentor or customer information that is sent to shipper 196 allows shipper 196 to ship the good to presenter 122. As described above, the customer information has a high degree of integrity and richness since it originates from the authentication process. Therefore, the value of the information serves as a foundation for merchant 132 and value-adding party 196 to enter into a transaction with each other. The range of these transaction types can vary greatly. In one instance, shipper 196 relies on the integrity and richness of the customer information to the degree that shipper 196 is willing to ship the product at a lower cost to merchant 132 and presenter 122. This may be the case because the customer information states that the presenter 122 has never requested delivery of a package back to a merchant. Additionally, merchant 132 can also rely on such customer information to the point that it is comfortable with relieving shipper 196 from responsibility or costs involved with a return delivery request by presenter 122.

The authentication and value-adding process begins with the authentication process as described by the numbered steps shown in FIG. 8. At steps 6 and 7, merchant 132 may include the customer information that it maintains in the PAReq message that is sent to issuer 190. At steps 9 and 10, issuer 190 may include the customer information that issuer 190 maintains in the PARes message that is sent to merchant 132. Issuer 190 also generates a transaction identifier, which is associated with the specific online transaction and the customer information.

The customer information can be for example: 1) customer contact information such as a name, mailing addresses, e-mail addresses, telephone numbers, and fax numbers; 2) customer payment history, such as number of payments made in full and number of payment defaults; and 3) shipping history, such as preferred shipping methods, number of shipments made without return service requests, and number of on-time shipments. The customer information can include any type of information collectable by issuer 190 and merchant 132.

Also at step 9, the customer information is stored by one or both of merchant 132 and issuer 190. Alternatively, the customer information is stored in a database such as authentication history server 130.

At step 13, merchant 132 evaluates the customer information against certain criteria to determine if such information should be sent to shipper 196. The criteria can be formulated such that customer information is sent to shipper 196 if customer information indicates that, for example, shipper 196 can complete its task without difficulty. The criteria helps analyze the risk of shipping to a certain customer by examining the available history information on the customer. Exemplary criteria include: 1) Has customer made more than a certain number of purchase transactions with the merchant?

2) Is the shipment address within a certain country, for example, the United States? 3) Has the customer failed to pay for a purchase before? 4) Has the customer requested return shipment before? 5) Is the customer a new customer? 6) Is the transaction for at least a certain monetary amount? 7) Is the shipping address verified? and 8) Is the country of delivery a low or high-risk country? Merchant 132, shipper 196, or both of the parties can set the criteria.

If the customer information satisfies the merchant's criteria, then the customer information and transaction identifier are sent to shipper 196. Since issuer 190 generates the transaction identifier, shipper 196 is assured of the veracity of the information. Relying on the customer information, shipper 196 ships the product to customer 122 with a certain level of assurance that the shipment can be made without difficulty and therefore without excessive costs. Due to the assurance of a trouble-free transaction for shipper 196 that the customer information provides, merchant 132 and shipper 196 may provide each other with extra considerations. For example, shipper 196 may be willing to ship the products at a lower cost to merchant 132 and customer 122. Also, merchant 132 can assume some of the risks of making a shipment on behalf of shipper 196 or merchant 132 can agree to partially compensate shipper 196 for the cost of shipping.

At step 14 shipper 196 stores the customer information along with the transaction identifier in value-add control server 198. Shipper 196 can ship the products to customer 122 with the transaction identifier printed upon the shipping label.

Step 15 involves retrieving the transaction identifier along with the associated customer information for various purposes. Such purposes include but are not limited to concluding a transaction between merchant 132 and value-adding party 196, dispute resolution, and/or data mining. The transaction identifier corresponds to specific transactions and therefore is useful for tracking the history of each transaction so that issuers 190, merchants 132, and value-adding parties 196 can verify information about each transaction. The present invention can also enable merchants to better protect themselves from purchase fraud where a customer might plead that he or she did not make a certain purchase. The invention can also enable shipping companies to better protect themselves from shipping fraud where a customer might falsely state a shipment was not received.

Customer information can be retrieved from authentication history server (AHS) 130 in either a "push" or "pull" situation. A "push" situation is one in which an event is expected to happened and therefore the customer information gets pushed onto the recipient, the value-adding party 196. A "pull" situation is one in which customer information is pulled by a recipient only upon an event that occurs irregularly. For example, customer information can be pulled only when a dispute arises which requires verification against the customer information and the transaction identifier stored within AHS 130.

Customer information and transaction identifiers can be retrieved from AHS 130 to conclude a transaction. These transactions are based upon sharing of the customer information and include additional terms to which each of the parties agrees. These transactions are referred to as value-adding transactions since the customer information served as the basis for additional transactions from which various parties can benefit. For example, a party to a value-adding transaction can receive additional business opportunities, receive more competitive costs for goods or services, and/or receive more advantageous contractual terms. Some transactions include an agreement by shipper 196 to ship a product for merchant 132 according to certain terms. Such terms can include a lower shipping cost charged to merchant 132 and/or the assumption of risk and liability by merchant 132. By checking the customer information and transaction identifiers, merchants 132 and shippers 196 can verify that shipper 196 made certain shipments. Then, for example, a merchant 132 would then pay shipper 196 the discounted shipping charge. Retrieving customer information and transaction identifiers to conclude transactions are push transactions when retrieving such information is a regular process for concluding such transactions.

Customer information and transaction identifiers are also useful to in dispute resolution situations. Disputes can arise between any of merchant 132, customer 122, and shipper 196. Disputes can be resolved by proving facts about a transaction with the information from AHS 130. When a dispute arises, customer information and a transaction identifier are "pulled" from locations at which such information is stored. A dispute between a merchant and a shipper can relate to fulfillment of value-adding transaction between each of the parties. For instance, when disagreement over payment for shipping services arises, merchant 132 can use such information to prove a shipment was made by shipper 196 at an agreed-to and discounted shipping charge. Or when a customer makes a complaint, for example, that a shipment was not received or the merchandise was damaged during shipping, then shipper 196 can prove that liability for such a transaction was assumed by merchant 132. In some instances, the liability could be assumed by issuer 190.

Customer information and transaction identifiers can also be used by each of merchant 132, issuer 190, and shipper 196 for data mining purposes. Each of these parties, through their transactions, can gain information about specific customers that can be analyzed to determine traits and tendencies of these customers. Such traits and tendencies can be used for marketing purposes of each of merchant 132, shipper 196, and issuer 190. Merchants 132 can use information about a customer's traits and tendencies to determine future sales and marketing strategies for a customer. Shipper 196 can also use such information for risk analysis, for example, to determine the likelihood of shipping products to a customer without encountering difficulties. And issuers 190 can use such information to determine the risk level of issuing future accounts to a customer or to determine if a credit level should be increased.

Additionally, information can be used by any of the parties to determine characteristics about any of the other parties. For instance, a shipper can determine if entering into agreements with a certain merchant would be a wise business decision. To perform such analysis, the customer information can be analyzed to determine a merchant's fraud history, chargeback history, common countries of shipment for their customers, etc. When such information shows that transactions with specific merchants are usually easy to ship, then a merchant can decide to conduct more business with such merchants. Merchants can analyze such data to determine if they want to satisfy their shipping needs with specific shippers. For example, the customer data can show which merchants have a high delivery success rate and on-time delivery score.

In embodiments where one or both of merchant 132 and issuer 190 hold customer information, customer information and the transaction identifier can be retrieved from each of the respective entities.

In an alternative embodiment of the shipping implementation of the invention, a merchant 132 can send out copies of customer data and a transaction identifier for a specific transaction to multiple shippers. Being that the customer data has a high level of integrity due to its origination from the authentication process, each shipper 196 may be interested in performing the shipping for the transaction. Each shipper 196 may be interested because the integrity of the customer information ensures the authenticity of information relating the transaction, for instance, the shipping address. More importantly, since the customer information was sent to each shipper 196 after passing merchant's criteria, each shipper 196 is ensured of a low likelihood of encountering problems with the shipping transaction. In the alternative, shippers 196 will at least be knowledgeable of the level of risk involved with the specific transaction. Furthermore, the shippers 196 may be interested in shipping the product for the transaction because the merchant 132 or issuer 190 may have agreed to assume the cost of risks with the transaction. Having such knowledge about the transaction and the customer, each of shippers 196 can then place a bid with merchant 132 for their cost of shipping. Merchant 132 can thereafter select one of shipper 196 to ship the product.

Follow-On Merchant as a Value Adding-Party

In an alternative embodiment of the authentication and information sharing process shown in FIG. 8, value-adding party 196 is a follow-on merchant 196. In this embodiment, the invention can increase the revenue opportunities for a follow-on merchant 196, and in some cases for a merchant 132 and an issuer 190. Follow-on merchant 196 receives customer information and a transaction identifier from merchant 132 and uses such information to market its own goods and/or services to customer 122. Follow-on merchant 196 can offer any type of goods or services, but they are likely to be somehow related to the goods or services sold by merchant 132. Customer information from merchant 132 is valuable in that a customer 122 may be likely to purchase something related to the subject of the transaction with merchant 132. Merchant 132 and follow-on merchant 196 can enter into various agreements with each other based upon the customer information.

This process also begins with the authentication process as described with, the numbered steps as shown in FIG. 8. At steps 6, 7, 9, and 10, merchant 132 and follow-on merchant 196 share information about customer 122 by including such information in PAReq and PARes messages as described previously. Also, issuer 190 generates a transaction identifier, which is associated with the specific online transaction and the customer information. The customer information and the transaction identifier are also stored by each of issuer 190, merchant 132, or within a single database, such as authentication history server 130.

At step 13, merchant 132 evaluates customer information to determine if it and the transaction identifier should be sent to follow-on merchant 196. Such customer information would be related, for example, to the average amount of money a customer spends, the maximum amount a customer spends, when a customer makes purchases, who a customer makes purchases from, what a customer spends money on, the gender of the customer, and the demographic information about the customer. It should be understood that the range of analysis about a customer's characteristics is extremely large. If the customer information passes through the criteria, then the information is sent to follow-on merchant 196 in step 13.

Upon receiving the customer information and the transaction identifier, at step 14, follow-on merchant 196 stores the customer data and the transaction identifier in its database, such as value add control server 198. At this time, follow-on merchant 196 can utilize the customer information to engage in a marketing strategy that is focused upon a specific customer. The customer information can inform follow-on merchant 196 as to how to tailor its marketing strategy for various customers. For instance, information about the amount a customer spends on specific transactions will inform follow-on merchant 196 as to the price level of goods or services that customer 122 may be interested in. Also, information about the goods or services sold by merchant 132 informs follow-on merchant 196 as to the types of related goods or services that customer 122 might want to purchase. For instance, if a customer purchased a CD player from merchant 132, then follow-on merchant 196 could sell certain CD's to customer 122. Such transactions can be referred to "complementary goods" transactions. Other complementary goods include, for example, cordless drills and rechargeable batteries, razors and razor blades, and lawn mowers and fertilizer.

Receipt of the customer information can be conditioned upon an agreement from follow-on merchant 196 to provide merchant 132 and/or issuer 190 with a percentage of any sales by follow-on merchant 196 that result from the customer information. Such sales and sales of similar nature are referred to as, for example, "up-sells" and "cross-sells." As can be imagined, receipt of customer information could be conditioned upon various agreements between merchant 132 and follow-on merchant 196. As described above, the customer information is uniquely valuable to follow-on merchant 196 since it is rich in details and is of high integrity. Customer information is rich in details since one or both of merchant 132 and issuer 190 have collected it. Each of merchant 132 and issuer 190 are in unique positions to gather certain types of information about customers. Finally, the customer information is of high integrity since it passed through the authentication process described by steps 1-12.

Step 15, again involves retrieving the transaction identifier along with the associated customer information for various purposes such as for concluding a transaction between merchant 132 and follow-on merchant 196, dispute resolution, and/or data mining. Step 15 may be required to conclude an agreement between merchant 132 and follow-on merchant 196 wherein information about a sale by follow-on merchant 196 is verified before sending a percentage of the follow-on sale to merchant 132. For instance, customer information and the transaction identifier can be retrieved by either merchant 132 or follow-on merchant 196 to verify that a follow-on sale was a result of the customer information. Then, upon such verification, a monetary amount is sent to merchant 132. In this situation, customer information can be pushed upon one or both of the merchants as a regular course of business for following through with the agreement, or the customer information can be pulled only when a discrepancy needs to be resolved.

In terms of dispute resolution, customer information and transaction identifiers are retrieved in case of disputes between any of merchant 132, follow-on merchant 196, or customer 122. Disputes can arise due to agreements between merchant 132 and follow-on merchant 196 that may have been violated. Again, when merchant 132 agrees to send customer information to follow-on merchant 196, follow-on merchant 196 might be required to share in any sales that follow from the customer information. Then, customer information can be pulled when a dispute arises regarding a payment that is due to merchant 132 from follow-on merchant 196. The parties can match the customer information and the transaction identifiers to verify if certain sales by follow-on merchants 196 were completed based upon the customer information.

Some agreements regarding the customer information can involve issuer 190 where issuer 190 can also expect a portion of any sales made by follow-on merchant 196.

Customer information can also be utilized for data mining purposes wherein each of issuer 190, merchant 132, and follow-on merchant 196 can gain knowledge about each other and customers. Their analysis of customer information can inform the parties if future transactions with each other would be favorable.

Various Parties as a Value Adding Party

In alternative embodiments of the account authentication and value-adding system, parties of various types can take on the role of customer 122, merchant 132, and value-adding party 196. The role of customer 122 and merchant 132 can be any parties that interact with each other online where merchant 132 requires authentication of customer's identity. Many commercial situations can be imagined where merchant 132 sells some sort of good or service to customer 122. However, many non-commercial situations can also be imagined. Some situations involve online registration for things such as driver's licenses, fishing licenses, building licenses, social security payments, and school class registration. It should be understood that the scenarios in which a party (such as merchant 132) will request the identity authentication of another party (such as customer 122).

The criteria evaluated by the identity authenticating party, such as merchant 132, can be related to various types of value-adding parties 196. The criteria typically will be related to whether a value-adding party 196 would desire to receive information about a party, such as customer 122, whose identity has been authenticated by the present invention. The customer information sent in step 13 can be related to each of the different value-adding parties 196. Where a customer 122 applies for a driver's license, the customer information can relate to, for example, the customer's driving record, car being driven, driving routine, and common destinations. A value-adding party 196 could be any party that desires to sell a good or service to customer 122 that is related to driving. For example, value-adding party 196 could be a smog inspection company, a repair shop, or an auto-insurance company. In other embodiments, value-adding party 196 might not sell anything that is related to driving. However, value-adding party 196 may still be selling a good or service that customer 122 may be interested in. For example, customer information may reveal that customer 122 drives a certain type of car and therefore customer 122 may be interested in a certain type of good or service. Various types of relationships can be extracted from the customer information and thereby be useful to a value-adding party 196.

When customer 122 obtains a fishing license, value-adding party 196 can be, for example, a fishing equipment store, a travel agency, or a clothing store. Again, value-adding party 196 need not be a company that is directly related to fishing. Customer information sent to value-adding party 196 can relate to customer's preferences with respect to fishing. The criteria evaluated by merchant 122 could determine what kind of fishing equipment customer 122 favors, what type of fishing is preferred, where customer 122 likes to go fishing, and the type of clothing customer 122 uses.

Customer information can be sent to a value-adding party for workflow purposes also. For instance, after customer 122 applies for a building permit or license from merchant 122, it might be necessary for customer information to be sent to another governmental agency for the next level of approvals. For example, a fire deputy might need to receive customer information in order to arrange a fire safety inspection during construction of a building.

Each of merchants 122 and value-adding parties 196 can also entering into value-adding relationships with each other based upon the sharing of the customer information and the transaction identifiers.

In some embodiments, merchant 122 can send customer information and transaction identifiers to multiple value-adding parties. Merchant 122 can evaluate different or the same sets of criteria for each type of value-adding party 196. Each value-adding party 196 would then proceed to perform its task either in parallel or in sequence with each other. Value-adding parties 196 can execute their respective task in real-time so that customer 122 receives immediate notification from each value-adding party 196 or the tasks can be executed off-line.

As described above, steps 15 can be used for the various purposes of concluding agreements between any of merchant 132, value-adding party 196, and issuer 190.

Security Organization as a Value Adding Party

Some embodiments of the present invention can be used for security purposes, such as for national security. In such embodiments, value-adding party 196 can be a governmental agency or any organization charged with the duty of reviewing intelligence (data) for security concerns. Merchant 132 can be any commercial, non-commercial, governmental, or non-government agency who conducts transactions with customer 122 online. For instance, merchant can be airline reservation company, a hardware store, a chemical supplier, or flight training school. Note that some or all of the transmission of customer information may be regulated by laws relating to privacy and civil rights.

Merchant 132 evaluates customer information against security related criteria and sends the information along with a transaction identifier to value-adding party 196 when certain criteria are met. For instance, the criteria can evaluate a customer's purchased items, license registrations, travel destinations, frequency of travel, and other security related matters. Upon receipt of the customer information and the transaction identifier, value-adding party 196 can perform its surveillance tasks.

The transaction identifier is useful for documenting the customer information so that security performance audits can be accurately tracked, if necessary. This may be necessary for example, in case of governmentally ordered investigations of security protocols. Specifically, merchants 132 may be required to prove they followed security protocol correctly. In some situations, merchants 132 are responding to court-ordered subpoenas. The customer information and the transaction identifiers can be pushed or pulled from authentication history server 130 in step 15. Step 15 can also be used for concluding agreements between merchant 132, a reporting party, and value-adding party 196. For instance, merchant 132 can receive credit or recognition for reporting useful information. This credit can be received after using the transaction identifier to prove the source, date, and other details regarding the customer information. Step 15 can also be used by various parties to pull data from authentication history server 130 for data mining of security related concerns. Since the customer information is gathered from issuer 190 and merchant 132, the customer information is likely to rich in information that is of great use for surveillance purposes.

In some embodiments, value-adding party 196 and merchant 132 communicate with each other in real-time such that a value-adding party 196 can send messages to merchant 132 immediately after receiving customer information. In this way, immediate action can be taken to resolve or avoid unwanted situations.

Preferred System Network

Figure 9:
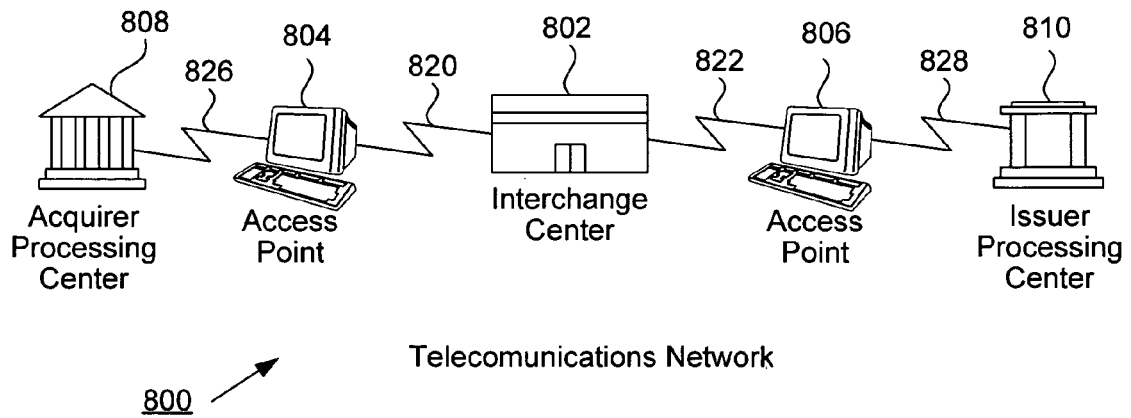
FIG. 9 illustrates a telecommunications network suitable for implementing an embodiment of the present invention.

FIG. 9 illustrates a telecommunications network 800 suitable for implementing an embodiment of the present invention. The present invention may make use of any suitable telecommunications network and may involve different hardware, different software and/or different protocols then those discussed below. The below-described network is a preferred embodiment of the telecommunications network 126 of FIG. 2. Network 800 is a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur online.

The main components of telecommunications network 800 are interchange centers 802, access points 804, 806 and processing centers 808 and 810. Other entities such as drawee banks and requester authorizing agents may also connect to the network through an access point. An interchange center is a data processing center that may be located anywhere in the world. In one embodiment, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, lines 820 and 822 that connect an interchange center to remote entities use dedicated high-bandwidth telephone circuits or satellite connections based on the IBM SNA-LU0 communication protocol. Messages are sent over these lines using any suitable implementation of the ISO 8583 standard.

An access point 804 or 806 is typically a small computer system located at a processing center that interfaces between the center's host computer and the interchange center. The access point facilitates the transmission of messages and files between the host and the interchange center supporting the authorization, clearing and settlement of transaction. Links 826 and 828 are typically local links within a center and use a proprietary message format as prefer by the center.

A data-processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 10:
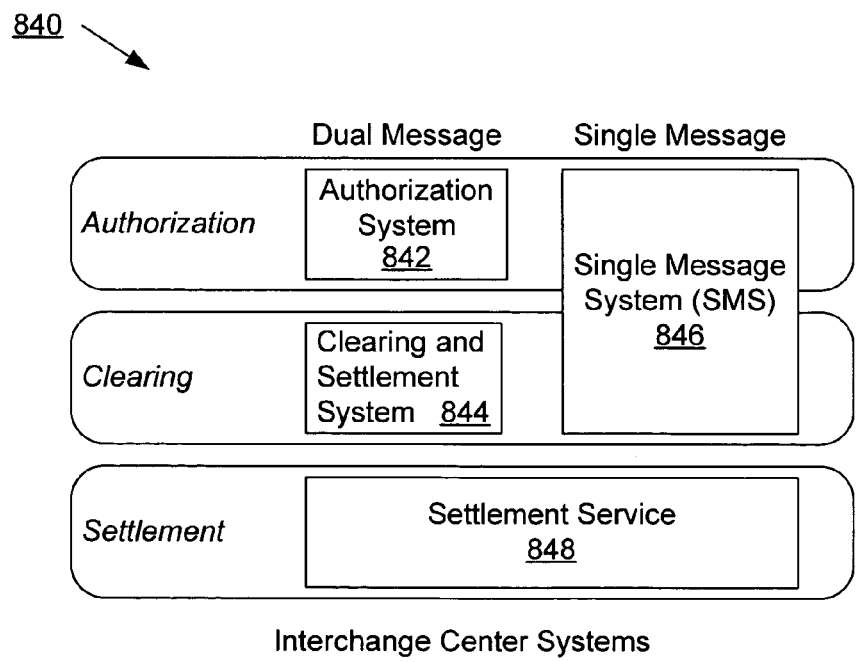
FIG. 10 illustrates systems housed within an interchange center to provide online and offline transaction processing.

FIG. 10 illustrates systems 840 housed within an interchange center to provide online and off-line transaction processing. For dual message transaction, authorization system 842 provides authorization. System 842 supports online and off-line functions, and its file includes internal systems tables, a customer database and a merchant central file. The online functions of system 842 support dual message authorization processing. This processing involves routing, presenter and card verification and stand-in processing, and other functions such as file maintenance. Off-line functions including reporting, billing, and generating recovery bulletins. Reporting includes authorization reports, exception file and advice file reports, POS reports and billing reports. A bridge from system 842 to system 846 makes it possible for members using system 842 to communicate with members using system 846 and access the SMS gateways to outside networks.

Clearing and settlement system 844 clears and settles previously authorized dual message transactions. Operating six days a week on a global basis, system 844 collects financial and non-financial information and distributes reports between members. It also calculates fees, charges and settlement totals and produces reports to help with reconciliation. A bridge forms an interchange between system 844 processing centers and system 846 processing centers.

Single message system 846 processes full financial transactions. System 846 can also process dual message authorization and clearing transactions, and communicates with system 842 using a bridge and accesses outside networks as required. System 846 processes Visa, Plus Interlink and other card transactions. The SMS files comprise internal system tables that control system access and processing, and the presentor database, which contains files of presentor data used for PIN verification and stand-in processing authorization. System 846 online functions perform real-time presentor transaction processing and exception processing for authorization as well as full financial transactions. System 846 also accumulates reconciliation and settlement totals. System 846 off-line functions process settlement and funds transfer requests and provide settlement and activities reporting. Settlement service 848 consolidates the settlement functions of system 844 and 846, including Interlink, into a single service for all products and services. Clearing continues to be performed separately by system 844 and system 846.

Figure 11:
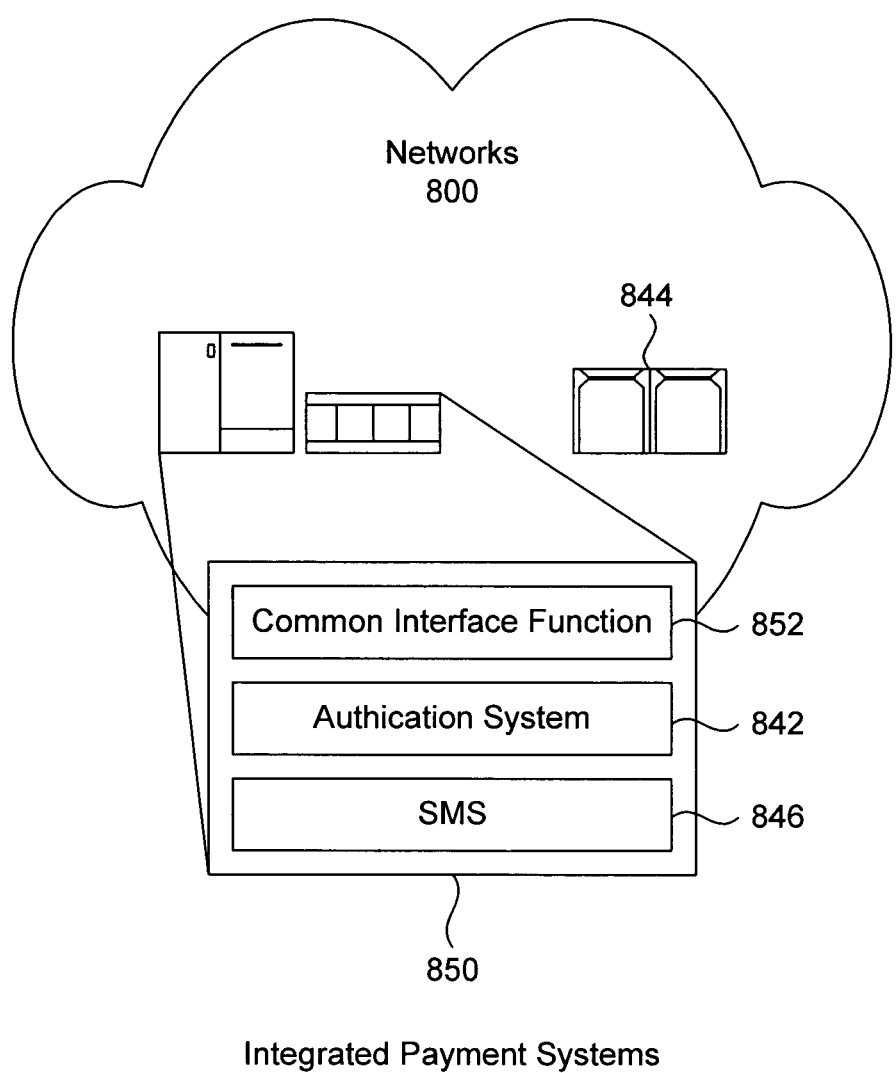
FIG. 11 illustrates another view of the components of the telecommunications network.

FIG. 11 illustrates another view of the components of telecommunications network 800. Integrated payment system 850 is the primary system for processing all online authorization and financial request transactions. System 850 reports both dual message and single message processing. In both cases, settlement occurs separately. The three main software components are the common interface function 852, authorization system 842 and single message system 846.

Common interface function 852 determines the processing required for each message received at an interchange center. It chooses the appropriate routing, based on the source of the message (system 842, 844 or 846), the type of processing request and the processing network. This component performs initial message editing, and, when necessary, parses the message and ensures that the content complies with basic message construction rules. Function 852 routes messages to their system 842 or system 846 destinations.

Computer System Embodiment

Figure 12A:
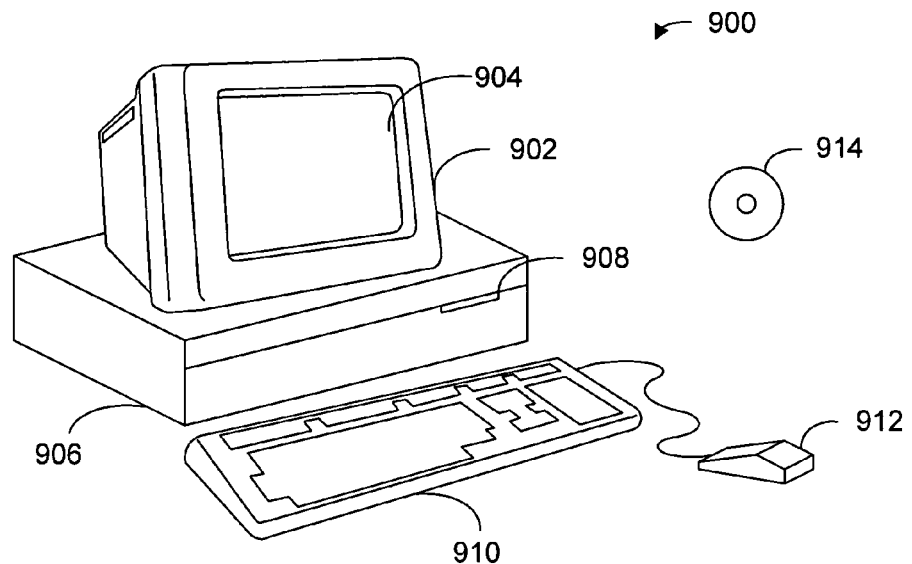
FIGS. 12A and 12B illustrate a computer system suitable for implementing embodiments of the present invention.
Figure 12B:
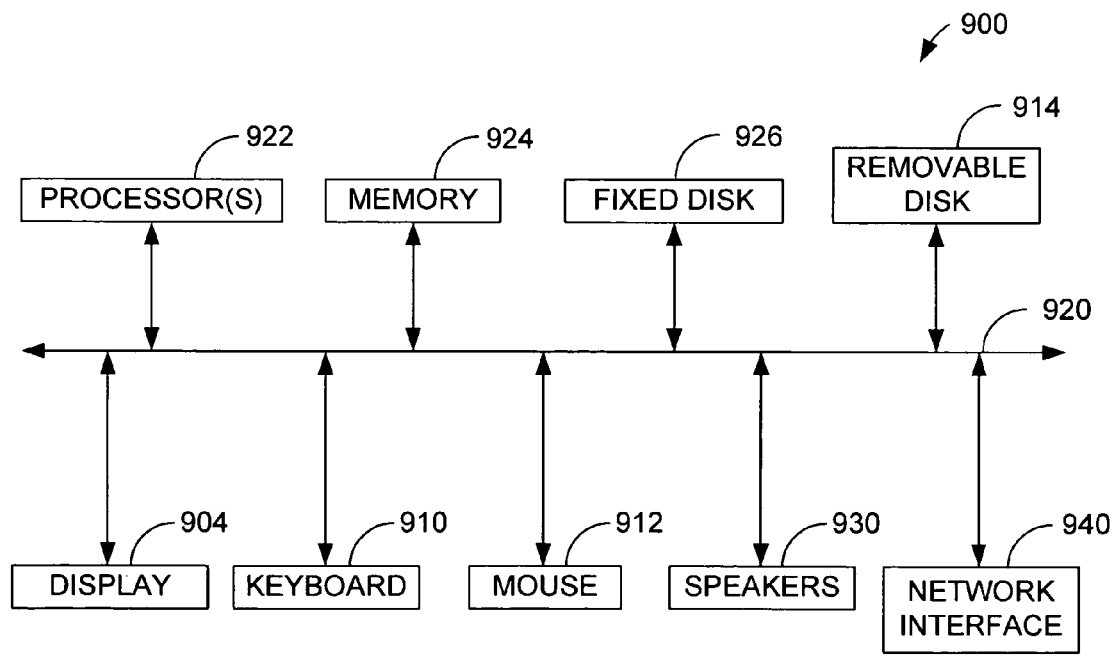

FIGS. 12A and 12B illustrate a computer system 900 suitable for implementing embodiments of the present invention. FIG. 12A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 12B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A method of providing presenter information of high integrity to a value-adding party in the course of an online transaction between an individual presenter and a requesting party, said method comprising:
   collecting presenter information pertaining to said presenter during the course of said online transaction, said presenter information being collected by said requesting party from a computing device of said presenter;
   receiving, by said trusted party at an access control computer, an online authentication request message from said requesting party to authenticate the identity of said presenter during said online transaction, said request message being routed via said computing device of said presenter;
   receiving, by said trusted party at said access control computer during said online transaction, an identity-authenticating token from said presenter;
   comparing by said access control computer said identity-authenticating token against a token previously designated for said presenter during said online transaction;
   sending an online authentication response message from said access control computer of said trusted party to said requesting party during said online transaction notifying said requestor that said presenter is authenticated when said identity-authenticating token matches said token previously designated for said presenter, said response message being routed via said computing device of said presenter; and
   sending said collected presenter information from said requesting party to said value-adding party.

2. A method as recited in claim 1 further comprising:
   evaluating, by said requesting party, said collected presenter information against a set of criteria, said criteria related to whether said value-adding party desires said collected presenter information; and
   sending said collected presenter information to said value-adding party when it is determined that said presenter information satisfies said set of criteria.

3. A method as recited in claim 1 further comprising:
   collecting said presenter information over the course of multiple online transactions by said presenter, whereby said presenter information represents activity by said presenter over multiple transactions.

4. A method as recited in claim 1 further comprising:
said value-adding party taking a specific action related to said presenter based in part upon said presenter information.

5. A method as recited in claim 1 wherein additional presenter information is included within said authentication response message that has previously been collected by said trusted party, said method further comprising:
sending said additional presenter information from said requesting party to said value-adding party.

6. A method as recited in claim 1 wherein said trusted party is an issuer that maintains an account of said presenter, said method further comprising:
verifying, by said issuer during a registration process, the identity of said presenter as the owner of said account and associating said previously designated token with said account.

7. A method as recited in claim 1 further comprising:
generating a transaction identifier uniquely identifying said online transaction and said presenter information by said trusted party;
including said transaction identifier with said online authentication response message that is sent to said requesting party by said trusted party, whereby said transaction identifier associates said presenter information with said online transaction; and
sending said transaction identifier with said collected presenter information from said requesting party to said value adding party, said value adding party being assured of the veracity of said presenter information.

8. A method as recited in claim 7 further comprising:
sending said presenter information and said transaction identifier to a history server for storage;
retrieving said presenter information and said transaction identifier from said history server; and
using said retrieved presenter information and said transaction identifier to conclude a transaction between said requesting party and said value adding party.

9. A method as recited in claim 7 further comprising:
sending said presenter information and said transaction identifier to a history server for storage;
retrieving said presenter information and said transaction identifier from said history server; and
using said retrieved presenter information and said transaction identifier to perform dispute resolution or to perform data mining.

10. A method as recited in claim 1 wherein said presenter information includes information describing the subject matter of said online transaction.

11. A method as recited in claim 1 wherein said presenter information includes purchasing behavior information concerning said presenter.

12. A method as recited in claim 1 further comprising:
said requesting party and said value-adding party entering into an agreement based upon said collected presenter information before said step of sending presenter information to said value-adding party.

13. A method as recited in claim 12 further comprising:
transferring a monetary value to said requesting party from said value-adding party in exchange for said presenter information.

14. A method as recited in claim 1 wherein said value-adding party is a shipping company, a follow-on merchant or a security organization.

15. A method as recited in claim 1 further comprising:
sending said collected presenter information to a plurality of value-adding parties;
receiving a quote for a service related to said presenter from at least one of said value-adding parties; and
selecting one of said value-adding parties based at least upon said received quote.

16. An authentication system that provides presenter information of high integrity to a value-adding party in the course of an online transaction between an individual presenter and a requesting party, said system comprising:
a computing device of a presenter, said presenter providing presenter information during the course of said online transaction to said requesting party;
a requesting party server computer of said requesting party arranged to engage in said online transaction with said computing device of said presenter, said requesting party computer arranged to send an online authentication request message to said trusted party via said computing device requesting authentication of the identity of said presenter;
an access control server of said trusted party arranged to receive an identity-authenticating token from said presenter, said access control server being further arranged to compare said identity-authenticating token against a token previously designated for said presenter and to send an online authentication response message to said requesting party via said computing device indicating that said presenter is authenticated; and
a server computer of a value-adding party arranged to receive said presenter information from said requesting party.

17. A system as recited in claim 16 wherein additional presenter information is included within said authentication response message that has previously been collected by said trusted party.

18. A system as recited in claim 16 further comprising:
a transaction identifier included within said online authentication response message uniquely identifying said online transaction and said presenter information, said transaction identifier being included with said presenter information that is sent to said value-adding party, wherein said transaction identifier associates said presenter information with said online transaction and said value-adding party is assured of the veracity of said presenter information.

19. A system as recited in claim 18 further comprising:
a history server to which is sent said presenter information and said transaction identifier for storage.

20. A system as recited in claim 16 wherein said presenter information includes information describing the subject matter of said online transaction.

21. A system as recited in claim 16 wherein said presenter information includes purchasing behavior information concerning said presenter.

22. A system as recited in claim 16 wherein said value-adding party is a shipping company, a follow-on merchant or a security organization.

23. A system as recited in claim 16 further comprising:
a plurality of value-adding parties; and
a plurality of server computers to each of which is sent said presenter information, each server computer being associated with one of said value adding parties.

24. A system as recited in claim 16 wherein said computing device of said presenter is a computer, a PDA or a mobile telephone.

25. A method as recited in claim 1 wherein said computing device of said presenter is a computer, a PDA or a mobile telephone.

26. A method as recited in claim 1 wherein said presenter information includes presenter contact information, presenter payment history information, or presenter shipping history information.

27. A method as recited in claim 1 wherein said request and response messages are sent via a browser of said computing device.

28. A method as recited in claim 1 further comprising:
redirecting an Internet browser of said computing device from said requesting party to said access control computer, whereby said trusted party receives said identity-authenticating token; and
redirecting said Internet browser of said computing device from said access control computer back to said requesting party.

29. A method as recited in claim 16 wherein said computing device includes a browser, and wherein said request and response messages are sent via said browser.

30. A method as recited in claim 16 wherein said computing device includes an Internet browser, wherein said browser is arranged to be redirected from said requesting party to said access control computer, and wherein said Internet browser is arranged to be redirected from said access control computer back to said requesting party.

\* \* \* \* \*